US011708785B2

(12) United States Patent
Condon

(10) Patent No.: US 11,708,785 B2
(45) Date of Patent: Jul. 25, 2023

(54) METHOD OF A CONTROLLED ENGINE, ENGINE AND VARIANTS

(71) Applicant: BRC ENGINES IP PTY LTD, Gympie (AU)

(72) Inventor: Brendan Robert Condon, Maryborough (AU)

(73) Assignee: BRC ENGINES IP PTY LTD., Gympie (AU)

( * ) Notice: Subject to any disclaimer, the term of this patent is extended or adjusted under 35 U.S.C. 154(b) by 0 days.

(21) Appl. No.: 16/803,539

(22) Filed: Feb. 27, 2020

(65) Prior Publication Data
US 2020/0191044 A1 Jun. 18, 2020

Related U.S. Application Data

(63) Continuation-in-part of application No. PCT/AU2018/051077, filed on Oct. 4, 2018.

(30) Foreign Application Priority Data

Oct. 4, 2017 (AU) .................................. 2017903994
Feb. 27, 2019 (AU) .................................. 2019201391

(51) Int. Cl.
*F02B 1/04* (2006.01)
*F02B 41/06* (2006.01)
(Continued)

(52) U.S. Cl.
CPC ................ *F02B 1/04* (2013.01); *F02B 41/06* (2013.01); *F01N 2240/02* (2013.01); *F02B 3/06* (2013.01);
(Continued)

(58) Field of Classification Search
CPC ........ F01B 31/14; F01N 2240/02; F02B 1/04; F02B 2075/027; F02B 3/06; F02B 41/06; F02B 43/10; F02B 47/02; F02B 75/02; F02D 13/0284; F02D 13/04; F02D 15/00; F02D 19/024; F02D 21/02; F02D 41/0027; F02D 41/402
See application file for complete search history.

(56) References Cited

U.S. PATENT DOCUMENTS 3,696,795 A 10/1972 Smith et al.
3,729,927 A 5/1973 Graves
(Continued)

FOREIGN PATENT DOCUMENTS

CH 148238 A 7/1931
JP 2000179349 A 6/2000
(Continued)

*Primary Examiner* — Carl C Staubach
*Assistant Examiner* — Diem T Tran
(74) *Attorney, Agent, or Firm* — Holzer Patel Drennan

(57) ABSTRACT

An internal combustion engine and a method of controlling an internal combustion engine are provided, that are more efficient than existing engines. The internal combustion engine includes a combustion chamber, and the engine is configurable to operate in: a compressionless operating mode where the engine is driven by combustion of fuel and oxidant in the combustion chamber without compression of the fuel and oxidant; and a compression generating operating mode where the engine is used to compress fluid in the combustion chamber.

20 Claims, 10 Drawing Sheets

(51) Int. Cl.
*F02B 75/02* (2006.01)
*F02B 47/02* (2006.01)
*F02B 3/06* (2006.01)

(52) U.S. Cl.
CPC ......... *F02B 47/02* (2013.01); *F02B 2075/027* (2013.01)

(56) References Cited

U.S. PATENT DOCUMENTS

| | | |
|---|---|---|
| 5,372,109 A | 12/1994 | Thompson et al. |
| 6,698,387 B1 | 3/2004 | McFarland et al. |
| 6,834,626 B1 | 12/2004 | Holmes |
| 2009/0188476 A1 | 7/2009 | Sasajima et al. |
| 2017/0159542 A1* | 6/2017 | Bilancia ................. F01M 5/021 |

FOREIGN PATENT DOCUMENTS

| | | |
|---|---|---|
| JP | 2003120283 A | 4/2003 |
| WO | 2014145955 A2 | 9/2014 |

* cited by examiner

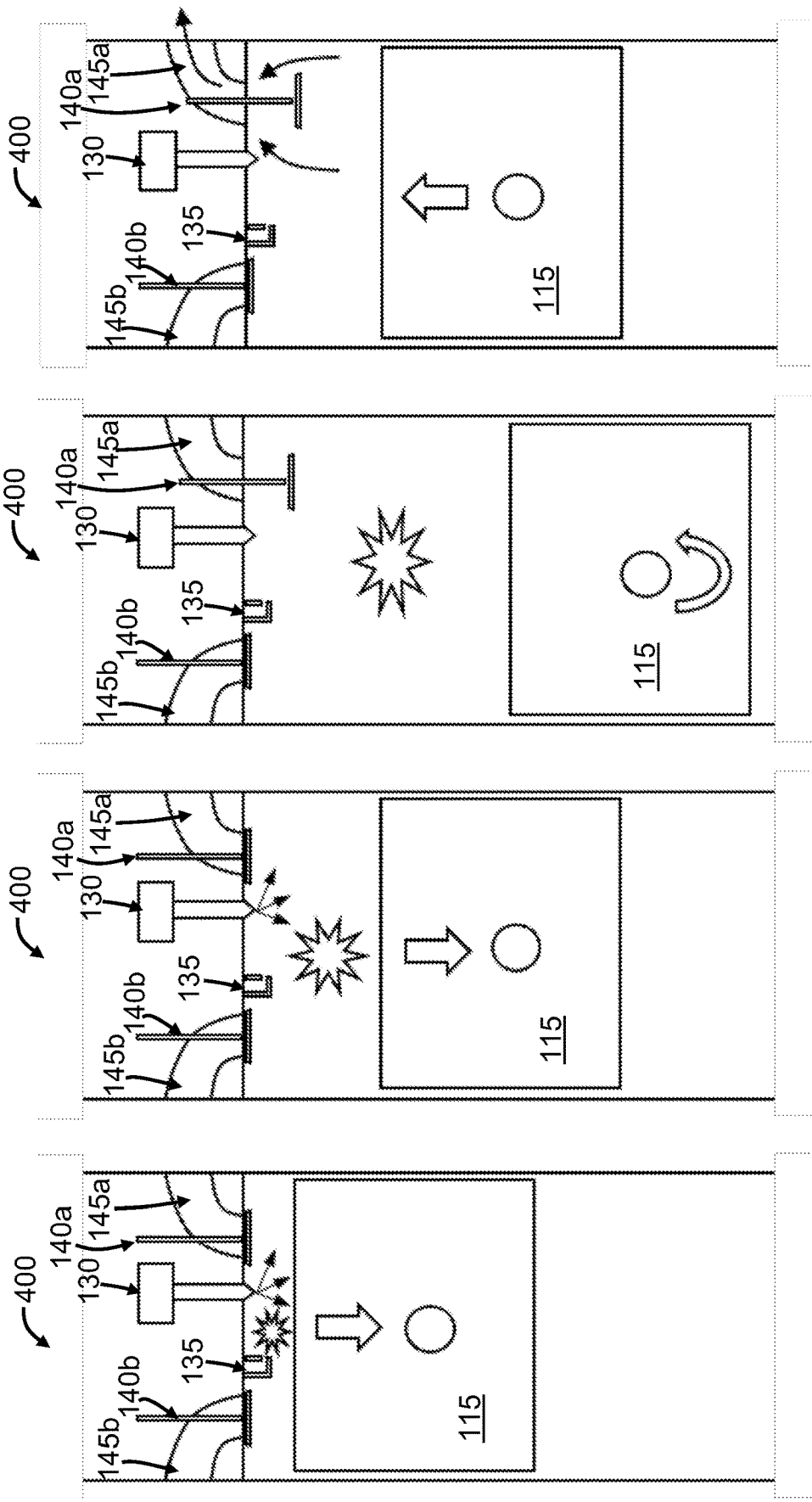

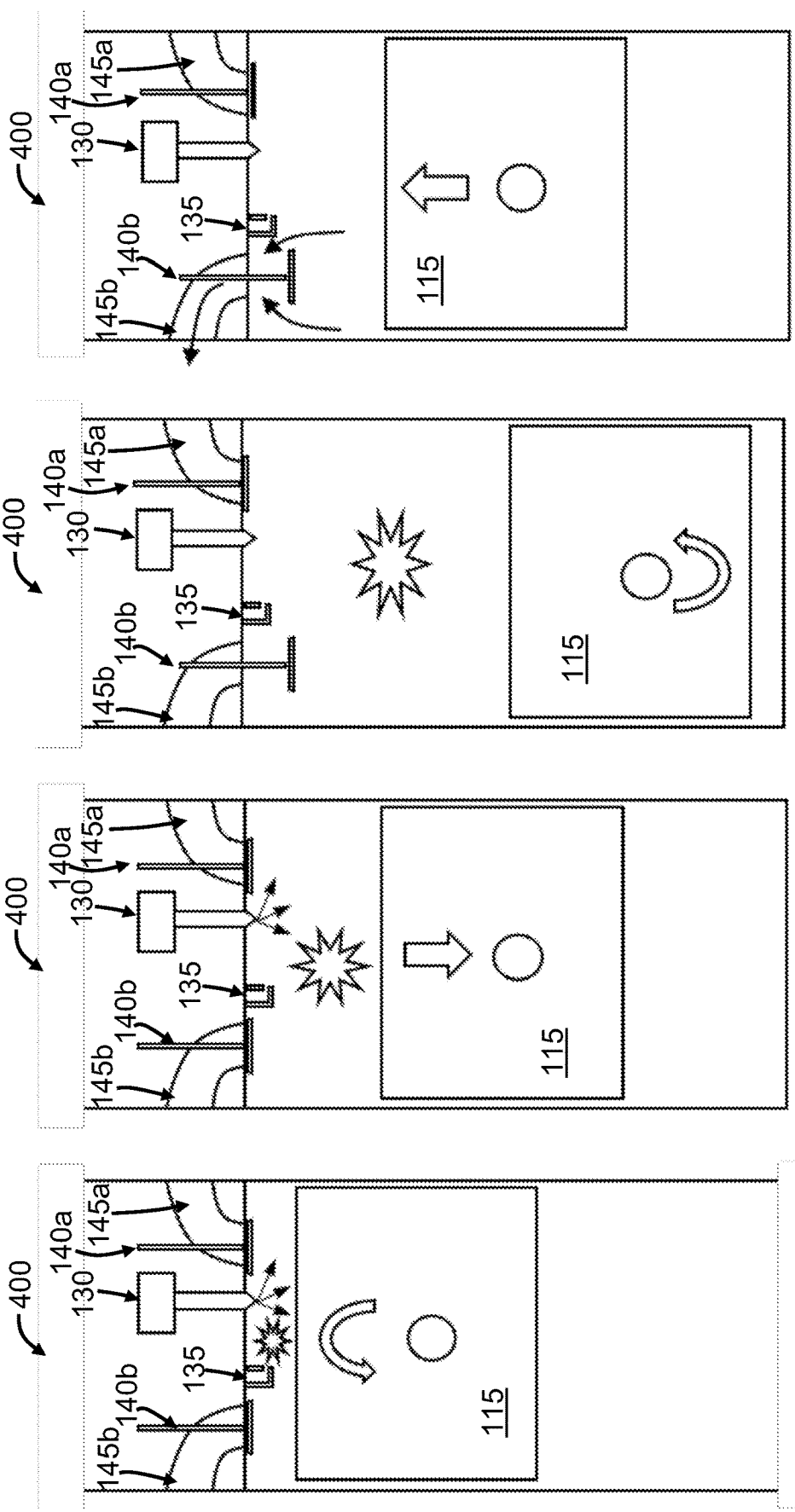

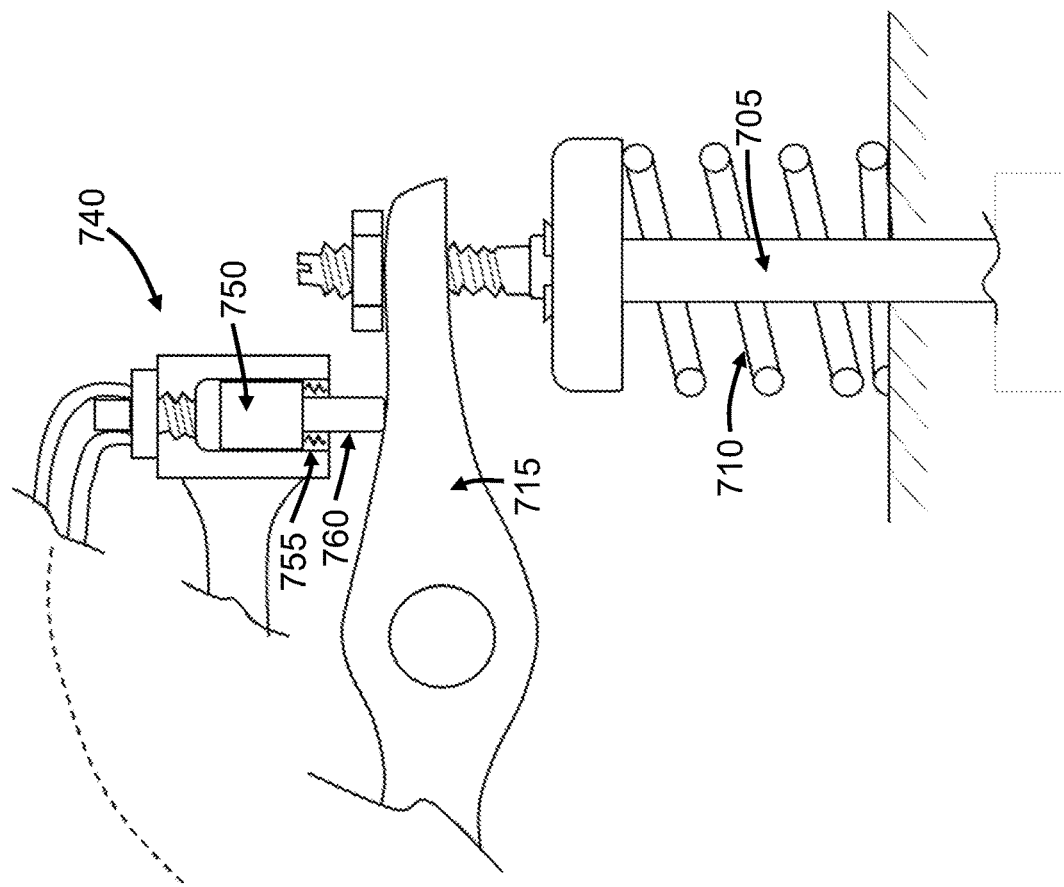
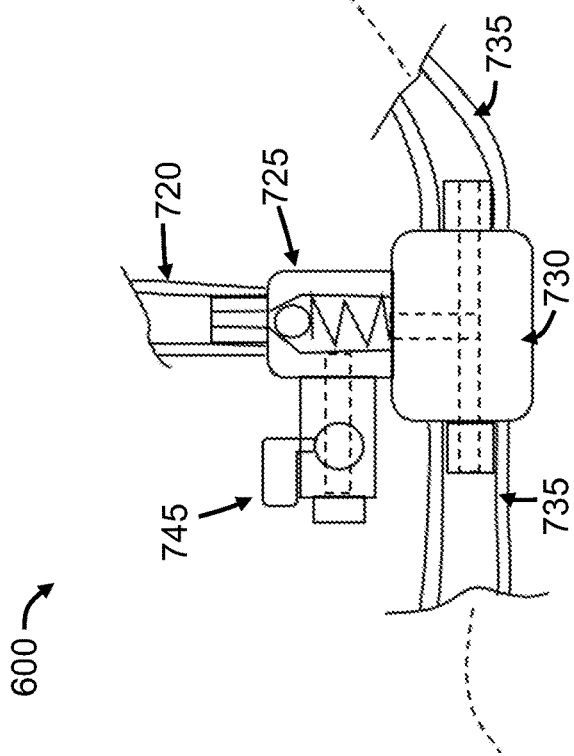

METHOD OF A CONTROLLED ENGINE, ENGINE AND VARIANTS

TECHNICAL FIELD

The present invention relates to combustion engines and methods of operating combustion engines.

BACKGROUND ART

Internal combustion engines are ubiquitous, and are commonly used to power vehicles, such as cars, trucks and buses, but are also used to power generators, pumps and the like. Most internal combustion engines are powered by fossil fuels, such as petrol (gasoline) or diesel, but there is a clear desire to transition to renewable energy.

Internal combustion engines that run on hydrogen and other renewables have been produced. In such case, these hydrogen engines are generally run in a similar way to a petrol (gasoline) engine, but using hydrogen as a fuel. A problem with these engines is that the combustion of hydrogen in air produces harmful and acidic bi-products containing nitrogen, which is clearly undesirable.

If the air is replaced with pure oxygen, these harmful biproducts are avoided and water is the only product. A problem, however, with doing so is that the combustion of hydrogen and oxygen alone is an uncontrolled explosion causing a shock wave rather than the controlled combustion like when air is used, and as a result cannot in its known form be used to efficiently and sustainably power an engine.

A further problem with internal combustion engines of the prior art is that they are inefficient. In a traditional four stroke engine, only one stroke of the four strokes is used for power. Furthermore, the compression stroke is inherently inefficient, as the engine is working to compress the air-fuel mixture, rather than driving the crankshaft.

Various attempts have been made to at least partly overcome these problems. For example, engines without a compression cycle have been provided, but are generally not efficient, and do not enable engine braking like a traditional internal combustion engine does. As such, these engines are generally unsuitable for use in vehicles, and particularly not in scenarios where engine braking is essential (e.g. when descending long hills where wheel brakes may quickly overheat).

Furthermore, the concept of injecting water into the cylinder to cool the combusted product, with a view of pulling back the piston by vacuum is known, theoretically enabling a single charge of the combustible gas mixture to achieve a double power stroke. Such configuration requires a stochiometric mixture of hydrogen and oxygen, which, as outlined above cannot in its known form be used to efficiently power the engine. Furthermore, as cylinder temperatures may be very high, large amounts of cooling liquids would be needed to sufficiently cool the combusted product in the time window available.

In practice, none of the above systems work to a level where they are overall more advantageous than a typical internal combustion engine, and as a result, inefficient internal combustion engines are commonly in use.

As such, there is clearly a need for an improved combustion engine and method of operating a combustion engine.

It will be clearly understood that, if a prior art publication is referred to herein, this reference does not constitute an admission that the publication forms part of the common general knowledge in the art in Australia or in any other country.

SUMMARY OF INVENTION

The present invention is directed to an improved combustion engine and method of operating a combustion engine, which may at least partially overcome at least one of the abovementioned disadvantages or provide the consumer with a useful or commercial choice.

With the foregoing in view, the present invention in a first aspect resides broadly in an internal combustion engine including a combustion chamber, the engine configurable to operate in:

a compressionless operating mode where the engine is driven by combustion of fuel and oxidant in the combustion chamber without compression of the fuel and oxidant by a compression stroke of the engine; and a compression generating operating mode where the engine is used to compress fluid in the combustion chamber Advantageously, the use of a compressionless mode of operation enables increased efficiency over traditional engines including a compression stroke when driving the engine, and the use of the compression generating mode enables the engine to compress a contents of the combustion chamber when needed, such as to perform engine braking or to act as a compressor.

Preferably, the engine is configurable to switch between the compressionless operating mode and the compression generating operating mode while the engine is running.

The engine may be able to switch modes at the end of a cycle.

Preferably, in the compression generating operating mode the contents of the combustion chamber does not include a fuel. The contents of the combustion chamber may include air, steam or any other suitable fluid.

Preferably, in the compressionless operating mode the engine is configured to:

initially provide the fuel and the oxidant into the combustion chamber, such that at least one of the fuel and oxidant is provided at a level significantly higher than stochiometric proportions, to thereby act as a buffer for initial combustion of the fuel and oxidant;

ignite the fuel and oxidant in the combustion chamber of the engine to thereby drive the engine; and subsequent to igniting the fuel and oxidant, provide further fuel and/or oxidant into the combustion chamber, such that levels of fuel and oxidant in the combustion chamber approach stochiometric proportions, and such that when combustion is complete, substantially all of the fuel and oxidant has been combusted.

Advantageously, the initial over supply of fuel or oxidant to act as a buffer for initial combustion prevents an initial shock wave, which can be damaging to the engine, and assists in providing usable energy in this initial phase. Furthermore, as the fuel and oxidant approach stochiometric proportions and all of the fuel and oxidant is combusted, the combustion is complete.

In the case of combusting a mixture of pure hydrogen in pure oxygen the combustion process will result in a reduction of gaseous volume. Depending on the volume of hydrogen and oxygen introduced compared to the size of the confined space, a negative pressure may result producing contractive forces which may be useful for the engine. Furthermore, such combustion of pure hydrogen in pure oxygen is less likely to generate harmful biproducts.

The term "stoichiometric proportions" herein relates to the proportion of chemicals required for the reaction. As such, after a reaction of chemicals in stoichiometric proportions, none of the initial chemicals remain, only product of the reaction. In the context of combustion of a fuel and an oxidant, combustion at stoichiometric proportions relates to complete combustion of all of the fuel and oxidant. Additional buffer and expandant, which does not take part in the combustion, may be added to the fuel and oxidant mixture without affecting the stoichiometric balance of the mixture.

The further fuel and/or oxidant may be provided in the same stroke of the engine as the initial fuel and oxidant. Preferably, the further fuel and/or oxidant is provided while the fuel and oxidant are still combusting. As such, the further fuel and/or oxidant need not be separately ignited.

Preferably, the fuel comprises hydrogen, and the oxidant comprises oxygen.

Preferably the fuel comprises substantially pure hydrogen. Preferably the oxidant comprises oxygen of at least 90% purity. The oxidant may comprise substantially pure oxygen.

Preferably, excess oxygen is initially provided to act as the buffer. Alternatively, excess hydrogen may be provided to act as the buffer.

Preferably, the engine includes at least one piston, wherein the at least one piston is driven by the combustion of the fuel and oxidant. The fuel and oxidant may be injected into the combustion chamber when the piston is at or near top dead centre. The engine may include a plurality of pistons.

The engine may include one or more cylinders defined at least in part by an engine block. The engine may include a cylinder head attached to the engine block.

Alternatively, the engine includes at least one rotor, wherein the at least one rotor is driven by the combustion of the fuel and oxidant.

Preferably, at least one of the fuel and the oxidant is injected into the combustion chamber in compressed form. The engine may include at least one injector, and the fuel and the oxidant may be injected directly into the combustion chamber using the at least one injector.

The engine may include a spark plug, configured to ignite the fuel and oxidant.

The engine may include a discharge valve provided in association with a discharge port to enable the product of the combusted fuel and the oxidant to escape from the cylinder. The product may comprise steam.

The discharge valve may be driven by a rotating camshaft. The discharge valve may be closed when the fuel and oxidant is injected into the combustion chamber.

The engine may include one or more one-way valves to prevent fluid from entering the combustion chamber through the discharge port.

The engine may include a condensing manifold, coupled to the discharge port, configured to provide a low-pressure environment to the combustion chamber. The condensing manifold may thereby extract a product of the combustion of the fuel and oxidant using a pressure differential between the combustion chamber and the condensing manifold. The condensing manifold may comprise a steam condensing manifold configured to condense a steam product of the combustion.

The condensing manifold may be further configured to drive the engine by providing a low-pressure environment in the combustion chamber. As an illustrative example, in a piston engine, a pressure differential between the combustion chamber and the crank case (i.e. an opposite side of a piston to the combustion chamber) may drive the engine.

Preferably, the condensing manifold is configured to provide a contractive power stroke to the engine. The contractive power stroke may be in addition to an expansive power stroke provided by the combustion of the fuel and oxidant.

The condensing manifold may include a one-way valve, downstream from the discharge valve, to enable excess product to escape from the condensing manifold, while enabling a low-pressure environment to be created therein.

The engine may include a piston and a discharge valve, such that the discharge valve is opened as the piston is at or near bottom dead centre (BDC), and the low-pressure environment of the condensing manifold is used to draw the piston upwards, towards top dead centre (TDC).

Preferably, the condensing manifold includes one or more heat exchangers, configured to remove heat from the combustion product in the condensing manifold. Preferably, the low-pressure environment is created substantially solely based upon the condensing of the product in the condensing manifold.

The condensing manifold may include a plurality of heat exchangers, each including at least one diversion flaps, adjustable to enable selective control of the flow of product (e.g. steam) through the heat exchangers.

The one-way valves may enable the steam condensing manifold to vent to atmosphere. The engine may be configured to purge the steam condensing manifold using the one-way valves.

The engine may be configured to inject a further fluid into the combustion chamber, the further fluid not involved in the combustion of the fuel and the oxidant. The further fluid may include or comprise water. The water may be pre-heated water.

The engine may include one or more channels associated with the combustion chamber, the one or more channels configured to pre-heat the further fluid. The channels may be defined by helical grooves extending around the combustion chamber.

The further fluid (e.g. water) may be injected such that it forms a gas (e.g. steam) shortly after injection, to thereby at least partly drive the engine. The further fluid (e.g. water) may be a product of the combustion of the fuel and oxidant, e.g. from an earlier cycle of the engine.

The engine may be configured to inject the further fluid into the combustion chamber only when pre-determined criteria are met.

The engine may be configurable to provide a power stroke based upon the injection of the further fluid only. The power stroke may be provided by the expansion of the further fluid into a gas in the combustion chamber.

The further fluid may include maintenance fluid, to ensures that the engine is lubricated, cleaned, and/or protected from corrosion. Alternatively or additionally, the maintenance fluid may be to control or adjust one or more properties or the operating conditions of components of the engine, such as the transfer of heat.

The engine may comprise a twin-stroke engine. The engine may include an expansive power stroke, followed by a discharge stroke. The discharge stroke may comprise a contractive power stroke.

Preferably, the engine does not include an intake or compression stroke in normal operation.

The engine may be configurable to provide engine braking by restricting the flow of gas from the discharge port. The engine may restrict the flow of gas from the discharge ports by keeping the discharge valves closed to compress gas in the cylinder. In such case, the discharge valves may open at or near the end of the compression stroke to release the compressed air, providing a space for the fresh intake air to move in to. The engine may include an engine braking valve outside of the combustion chamber, which may be closed to compress gas outside of the combustion chamber.

The engine may be configured to inject water (or other liquid) into the cylinder to facilitate engine braking. The water may be injected such that it turns into steam, and wherein the steam is compressed to facilitate the engine braking. The water may be pre-heated.

The engine may be configurable to compress air. The air may be compressed in the combustion chamber. The engine may include an intake valve, for receiving uncompressed air, and a discharge valve, for providing the compressed air.

The air may be compressed independently of the combustion of the fuel and the oxidant. The air may be compressed in a different cycle to the combustion of the fuel and the oxidant.

The air may be compressed outside of the combustion chamber. An air compressor may be driven by steam of the engine.

The engine may be configurable to be driven, at least in part, by the compressed air. The engine may be configurable to be braked by the compressed air.

The engine may include variable discharge valve timing, to enable the discharge valve to operate at different timing when compressing air compared to when combusting the fuel and oxidant. The variable discharge valve timing may be hydraulic.

The engine may include selective intake valve timing, such that the intake valves are opened in a cycle when compressing air, but not open in a cycle when combusting the fuel and oxidant.

The engine may comprise a plurality of combustion chambers.

The engine may include a plurality of cylinders, wherein each cylinder is selectively configurable to operate in one or more operating modes. The cylinders may each include a piston configured to drive a common crankshaft. As an illustrative example, the engine may be configured to inject water into cylinders on alternate cycles, such that a first bank of cylinders operates on water/steam only for a cycle, and a second bank of cylinders operates on combustion of fuel and oxidant for a cycle. In another example, the engine may be configured to provide on at least one cylinder a cycle of two water only strokes followed by a combustion stroke.

The engine may be configured to utilise water only strokes only when a temperature of the engine is above a certain threshold (e.g. not during an initial start). Similarly, when injecting water, different amounts of water may be used depending on a temperature of the engine.

The engine may be configured to adjust levels of fuel, oxidant and/or water injected into the combustion chamber based upon load, engine speed or the like. As an illustrative example, in response to an increase in load, the engine may be configured to inject more fuel, oxidant and water into the combustion chamber.

In a second aspect, the invention resides broadly in a method of operating an internal combustion engine including a combustion chamber, the method including:

configuring the engine to operate in a compressionless operating mode where the engine is driven by combustion of fuel and oxidant in the combustion chamber without compression of the fuel and oxidant by a compression stroke of the engine; and subsequently reconfiguring the engine to operate in a compression generating operating mode where the engine is used to compress fluid in the combustion chamber.

Advantageously, the use of the fuel and or oxidant as a buffer for initial combustion avoids an initial shock wave, while enabling ratios of the fuel and oxidant to be adjusted to provide complete combustion in that stroke, thereby enabling the contractive force of a combustion to also be used.

Preferably, the fuel comprises hydrogen, and the oxidant comprises oxygen.

Preferably, at least one of the fuel and the oxidant is injected into the combustion chamber in compressed form. The fuel and the oxidant may be injected directly into the combustion chamber using an injector.

Preferably, the engine includes at least one piston, wherein the at least one piston is driven by the combustion of the fuel and oxidant. The fuel and oxidant may be injected into the combustion chamber when the piston is at or near top dead centre. The engine may include a plurality of pistons.

Alternatively, the engine includes at least one rotor, wherein the at least one rotor is driven by the combustion of the fuel and oxidant.

In a third aspect, the invention resides broadly in a power system including:

electrolysis unit to generate hydrogen and oxygen from water;

storage means, for storing hydrogen and oxygen; and an engine according to the first aspect, configured to drive a generator to generate power.

The power system may include one or more solar panels configured to power the electrolysis unit. The solar panels may be configured such that excess power is used to power the electrolysis unit and thereby generate hydrogen and oxygen. The engine may be configured to drive the generator when the solar panels do not generate sufficient power.

The storage means may comprise one or more tanks.

In a fourth aspect, the invention resides broadly in a steam condensing manifold for an internal combustion engine, the steam condensing manifold configured to condense a product of combustion of the internal combustion engine to generate a low-pressure environment to thereby provide a contractive power stroke to the engine.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which:

FIGS. 4a-4h illustrates an operation of an engine in one configuration, according to an embodiment of the present invention.

FIG. 7 illustrates another portion of the engine of FIG. 6, according to an embodiment of the present invention.

FIG. 8 illustrates a cross sectional view of a portion of a camshaft, according to an embodiment of the present invention.

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

DESCRIPTION OF EMBODIMENTS

Figure 1:
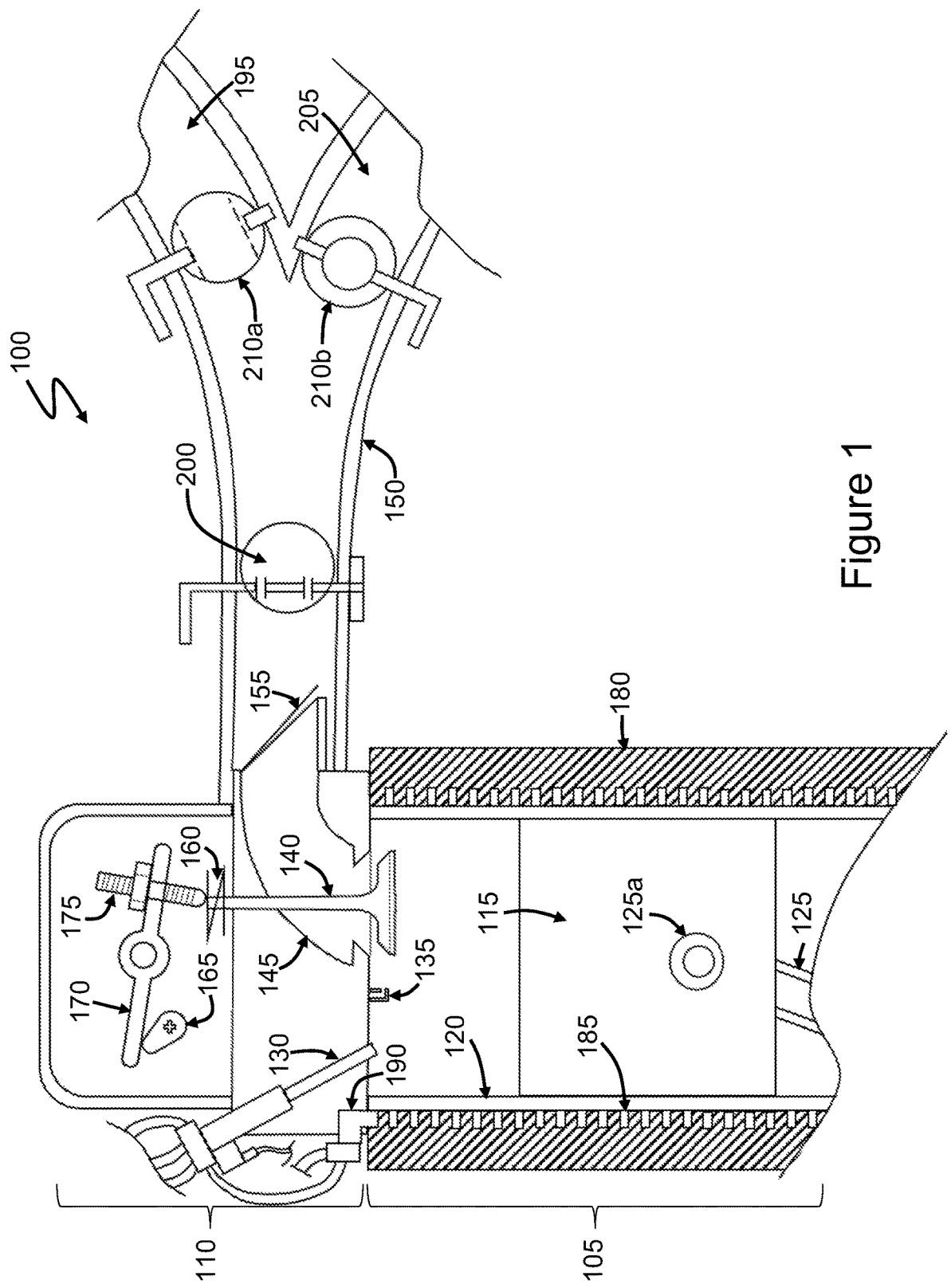
FIG. 1 illustrates a cross sectional view of an internal combustion engine, according to an embodiment of the present invention.

FIG. 1 illustrates a cross sectional view of an internal combustion engine 100 according to an embodiment of the present invention. The engine 100 is more efficient than traditional internal combustion engines as it does not have the compressive losses or wasted travel that these engines have. It does, however, still use pressurised internal gasses to harness the temperature differential produced by the combustion of a fuel gas mixture. Furthermore, when the engine is using a hydrogen/oxygen mixture, for example, engine 100 is able to control the rate and duration of the expansion step and separately the rate and duration of the contraction event during the fuel combustion, to thereby harness more of the energy from the combustion in a usable form. In this process, the engine 100 does not produce the harmful bi-products, such as acids and bi-products containing nitrogen and carbon, and as such, is environmentally friendly.

The engine 100 includes one or more cylinders defined by an engine block 105 and a cylinder head 110 attached to the engine block 105. The cylinders are sealed at one end by the head 110.

A piston 115 slides sealingly within a bore defined by a sleeve 120 of the block 105 in a reciprocating manner to drive a crankshaft or driveshaft (not illustrated). In particular, the piston 115 is pivotally attached to a connecting rod 125 by a gudgeon pin 125a at one end, and at its other end is rotatingly attached to the crankshaft. The connecting rod 125 reciprocates through the open end of the bore as it converts the linear motion of the piston 115 to circular motion of the spinning crankshaft.

A multi-fluid injector 130 is provided in the cylinder head 110 and is configured to inject fluid directly into the cylinder and above the piston 115. The fluid comprises oxygen and hydrogen, and is ignited by a spark plug 135 in the cylinder to drive the piston 115 downwards, as outlined in further detail below. However, a range of fuels and oxidants can alternatively be used. Similarly, while a single multi-fluid injector 130 is illustrated, in alternative embodiments, different injectors may be used to inject different fluids.

A discharge valve 140 is provided in association with a discharge port 145 to enable the steam (produced by the combustion of the hydrogen and oxygen) to escape from the cylinder, much like an exhaust valve of a traditional four-stroke engine. The discharge valve 140 is coupled to a discharge manifold 150, by a one-way valve 155.

The one-way valve 155 enables the use of a vacuum in the combustion chamber to assist movement of the piston 115 upwards. The use of the one-way valve directly in proximity to the discharge port 145 enables the piston 115 to be driven either by the vacuum in the combustion chamber, or a vacuum generated outside of the combustion chamber, and by whichever is greatest.

The discharge valve 140 is biased into a closed position by a valve spring 160, and is opened in a synchronised manner with movement of the piston 115 based upon rotation of a camshaft 165. In particular, the camshaft 165 includes eccentric lobes which when the camshaft 165 rotates causes a rocker arm 170 to open the valve 140 by a discharge valve adjusting screw 175. The discharge valve adjusting screw 175 enables adjustment of the valvetrain.

The camshaft 165 rotates about its long axis in a timed manner with the rotating movement of the crankshaft. The camshaft 165 and crankshaft may be coupled by a timing chain or belt and respective gears, or by any other suitable means.

While not illustrated, the engine may include means to adjust the timing of the discharge valve 140, either relative to the rotation of the crankshaft, or independently of the camshaft 165. As an illustrative example, an electro-hydraulic sprocket may be provided that enables the rotation of the camshaft to be adjusted relative the crankshaft, and thereby provide variable valve timing (WT). In other embodiments, electrically controlled camless valve systems may be used. Yet another embodiment is described in further detail below.

As mentioned above, the oxygen and hydrogen blend in the cylinder is ignited by a spark plug 135 to drive the piston 115 downwards. Initially, the hydrogen and oxygen are injected into the cylinder such that there is significant excess oxygen such that the excess oxygen acts as a buffer to the hydrogen and oxygen that is initially ignited. This enables the increase in gas pressure after ignition to be provided in a controlled manner, rather than though a destructive shock wave.

In particular, the excess oxygen will not initially be chemically involved in the combustion process and instead acts as a buffer in that it a) is retardant and controls the initial rapid explosion of combusting hydrogen and b) is an expandant as it expands as it absorbs the heat energy of the combustion of the other oxygen and hydrogen, thus also driving the reciprocating piston 115.

After the initial oxygen rich (and thus buffered) mixture is ignited, further hydrogen and possibly oxygen are injected which combust with the oxygen already in the cylinder. This is continued until the hydrogen and oxygen reach stoichiometric proportions, upon which the last of the hydrogen and oxygen is combusted and thus converted into steam (i.e. 2 molar parts hydrogen to 1 molar part oxygen, $2H^2+O_2 \rightarrow 2 H_2O$).

The use of oxygen as an initial buffer enables the "buffer" to be later removed (through combustion with later added hydrogen to produce pure steam), which in turn enables the engine to harness the resultant implosion, as outlined in further detail below. Furthermore, by using an excess amount of oxygen as the initial buffer, which is later combusted, rather than the other components found in air, the production of harmful by-products containing nitrogen and carbon are avoided.

The hydrogen and oxygen are selective injected (over time) to provide a controlled expansion of the combusting mixture to maximise the useful forces acting on the piston 115 and to minimise the destructive shock waves produced by uncontrolled explosion events. This may include a partial overlap of injection of hydrogen and oxygen, variable rates of injection of hydrogen and oxygen (e.g. oxygen is injected at a higher rate initially), or by any other suitable means.

The injector 130 may be controlled by an engine control or management system (not illustrated) to such that the mixture of hydrogen and oxygen changes depending on a load or speed of the engine. At low RPM, at the point of ignition, the initial mixture may include a high proportion of oxygen compared to hydrogen causing the resulting initial explosion to be subdued. As the load or speed of the engine increases, the expansion rate of the combustion of the hydrogen and oxygen can be accelerated using higher proportions of hydrogen at the start of each engine cycle, resulting in a mixture containing uncombusted hydrogen expanding rapidly. In other words, the engine may be configured to use an excess of hydrogen as this initial buffer in a very similar manner to the use of excess oxygen.

Similarly, the initial combustion ratios of hydrogen and oxygen may be changed depending on load or speed of the engine. In a fast moving engine, a more explosive mixture may be provided than in an engine at idle and a different ignition mixture again for an engine in a high load low speed situation.

Furthermore, the combustion of hydrogen with oxygen may be transitioned between a controlled expansion process and a controlled contraction process with the addition of either oxygen or hydrogen moving the mixture towards or away from a stochiometric ratio.

In one embodiment, the injection of oxygen into the cylinder starts prior to the injection of hydrogen. The delay may be dependant on the total volume of hydrogen and oxygen required and the rate in which they can be injected, but the hydrogen is preferably injected shortly before ignition to minimise the likelihood of an unwanted ignition of free hydrogen, in the cylinder or elsewhere (e.g. due to leaks). Furthermore, free hydrogen in the combustion chamber also increases the risk of hydrogen embrittlement of exposed metal components.

In one embodiment, hydrogen and oxygen levels in discharge mixtures are monitored and injection ratios are adjusted if an excess of either gas is detected.

The hydrogen and oxygen are substantially pure, unlike air, which comprises a mixture of nitrogen, oxygen, argon, carbon dioxide and other gases. As a result, the product of the combustion is water (in the form of steam). The volume of steam to be discharged at the completion of the contractive power stroke will be dependant directly on the total volume of hydrogen and oxygen that are injected into the cylinder.

FIGS. 2a-2d, which are simplified for the sake of clarity, illustrates a complete cycle of the engine 100 in one configuration.

Figure 2D:
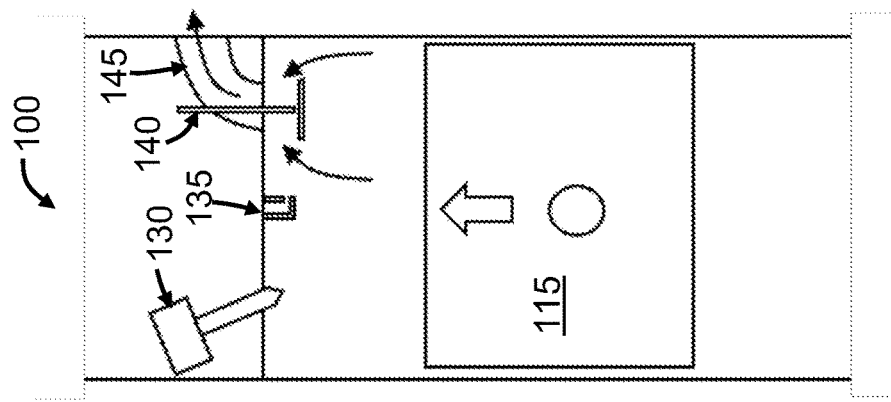
FIGS. 2a-2d illustrates a complete cycle of the engine of FIG. 1 in one configuration.
Figure 2C:
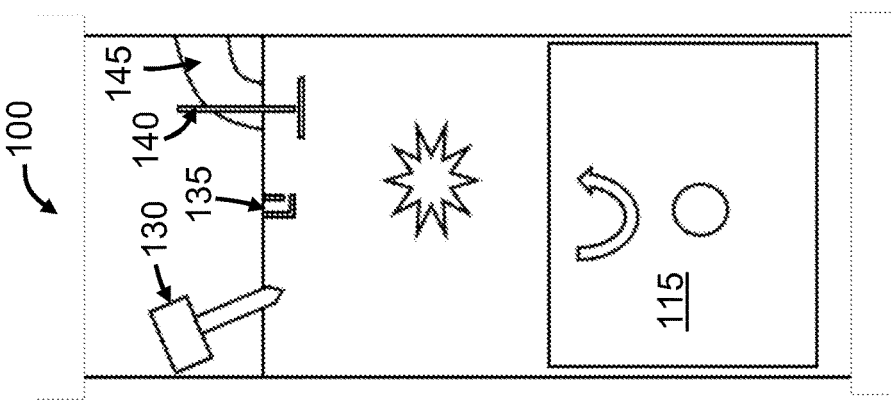
Figure 2B:
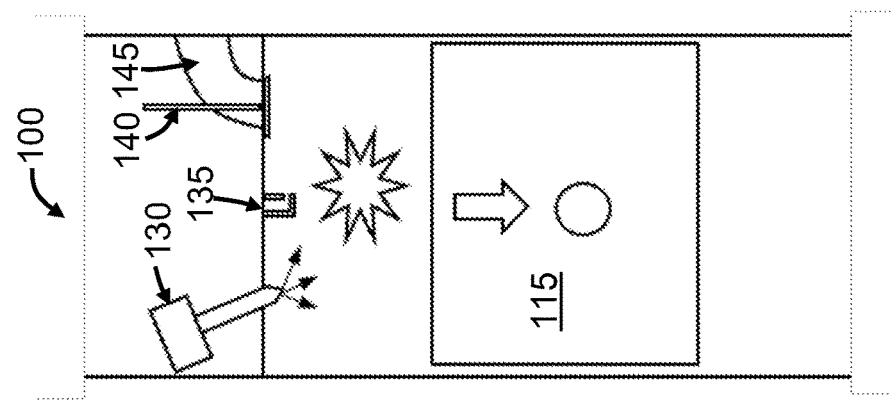
Figure 2A:
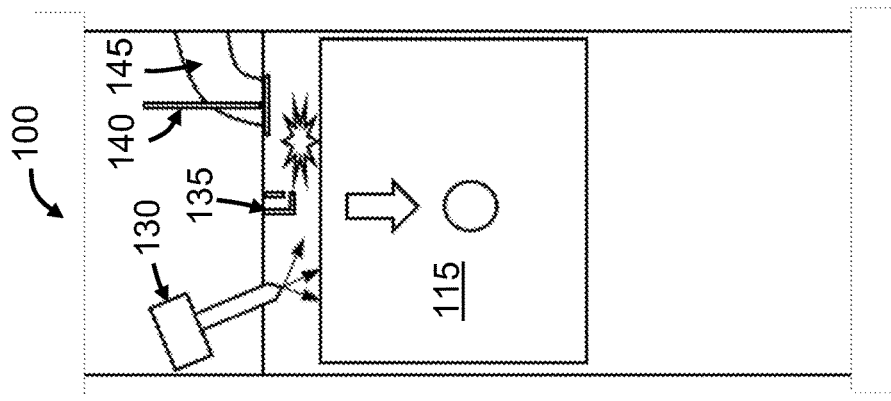

In FIG. 2a, the piston 115 is at top dead centre, namely where the piston is at (or near) the top of is movement of travel. The discharge valve 140 is closed, and the cylinder is thus sealed closed.

Hydrogen and oxygen are injected into the cylinder such that there is excess oxygen to provide a buffer for the hydrogen that is initially ignited. The spark plug ignites the hydrogen and oxygen mixture in the combustion chamber, which forces the piston 115 downwards in a controlled manner due to the presence of the excess oxygen acting as a buffer.

As the piston 115 moves downwards, further hydrogen (and potentially further oxygen) is added to the chamber, providing fuel to the already existing combustion (process/event?), as illustrated in FIG. 2b. The valve 140 remains closed, and as such, the further combustion continues to push the piston 115 downwards.

As the piston 115 approaches bottom dead centre, namely where the piston is at (or near) the bottom of its movement of travel, the mixture of hydrogen and oxygen reaches stoichiometric proportions and ends without any oxygen or hydrogen remaining in the cylinder.

At or around this point the discharge valve opens 140, enabling the combustion product (i.e. steam) to escape through the discharge port 145.

As the piston 115 travels upwards (i.e. towards the discharge valve 140 and top dead centre), the discharge valve remains open, and thus the combustion product (i.e. steam) continues to exit through the discharge port 145.

As the piston 115 approaches top dead centre, and as substantially all of the combustion product (i.e. steam) has left the cylinder) the discharge valve 140 closes, and the process is repeated through injection of hydrogen and oxygen as illustrated in FIG. 2a. Alternatively, if the discharge valve closes slightly before top dead centre any remaining gasses such as steam will be compressed by the remainder of the piston contraction and can be used as additional buffers/expandants for the next stroke. As such, the cycle of the engine 100 is completed with substantially two strokes of the piston, namely a power stroke (downwards movement of the piston 115) and a discharge stroke (upwards movement of the piston 115), and one revolution of the crankshaft.

As outlined above, the piston 115 is not used to compress the hydrogen or oxygen, as is the case for a traditional combustion engine, and as such, the engine does not have a compression stroke. As a result, the engine is able to operate more efficiently as the work traditionally used in the compression stroke is no longer taxed from the engine output and the power strokes occur with twice the frequency.

While the above description makes reference to the open and closing of valves 140 at particular points in time, the skilled addressee will readily appreciate that the opening and closing of the valves 140 is a gradual process, the degree of which depends upon the shape of the lobe of the camshaft. As a result, the valve 140 starts closing before the piston 115 reaches top dead centre, such that the valve 140 is completely closed at or around top dead centre. Similarly, the valve starts opening before the piston 115 reaches bottom dead centre, such that the valve 140 is completely open at or around bottom dead centre.

The timing of the cam shaft may be dynamically adjusted with respect to the crank shaft, as outlined in further detail below. Such an adjustment could be used to optimize the operating conditions within the engine as it varies in RPM, load or mode of operation.

The discharge valve may open when the piston moves towards bottom dead centre. The piston may be at 5 to 0 degrees before bottom dead centre, for example when the discharge valve opens. Similarly, the discharge valve may be closed before the piston reaches top dead centre, and as early as 41 degrees before top dead centre.

The engine block 105 includes a cylinder wall 180, which the sleeve 120 is received, as outlined above. The cylinder wall 180 includes internal spiralling, thread-like grooves 185, which provide a flow passage for water (or other fluid) between the cylinder wall 180 and the sleeve 120, which heats the fluid and cools the cylinder wall 180. In an alternative embodiment, the sleeve may include external spiralling, thread-like grooves, which provide a similar flow passage for water (or other fluid) between the cylinder wall 180 and the sleeve 120.

An internal surface of the cylinder wall 180 may be machined to provide the groove 185. The portion of the cylinder wall 180 that is not machined seals against an outside surface of the sleeve 120 such the spiralling groove 185 and sleeve forms an elongate channel around the cylinder in which the water (or other liquid) may flow.

The groove 185 is coupled to an outlet 190 adjacent to the cylinder head 110, which outlet 190 is coupled to the injector 130. The injector 130 is configured to inject the heated water into the cylinder when the discharge valve 140 is closed and the piston is in or near its expanding power stroke (i.e. moving downwards).

The water turns into steam in the hot combustion chamber (nearly instantly), which has a much greater volume than the injected water, thus increasing pressure in the cylinder, and thereby assists the piston in the expansive power strokes. In particular, the excess heat of the cylinder transforms the heated water into pressurised steam and provide a means to force the piston 115 in a direction that is useful for the application at that time.

1 mL of preheated water will expand into about 1600 mL of steam. As such, the mere injection of 2 ml of water into a 3.2 litre engine expanding to 1600 times the volume at 100 C, provides approximately the same volume of fluid that a naturally aspirated engine draws in and compresses—but without the expensive running cost of providing such compression. This "compression replacement"—steam can be used to harness the temperature increase resultant from the internal combustion event and provide a similar "push" to the piston as the previously compressed cylinder air would have done. As such, the use of such small amounts of water will provide significant torque to the engine.

Although the preheated water may spontaneously boil as it is injected into the combustion chamber, it will still extract excess heat from the internal components of the chamber. As the water is pre-heated (e.g. near boiling or 100° C.) before entering the cylinder, a force applied to the piston 115 is maximised, while minimising the potential of thermal shock and resultant cracking it may inflict on the superheated internal components of each chamber.

The preheated water may be heated to above 100° C. and be prevented from boiling by being held at high pressure prior to being injected into the combustion chamber.

The preheated water may be introduced as early as 40 degrees before top dead centre to ensure that it provides maximum effect (i.e. to maximise heat absorption time).

The outlet 190 is also coupled to a bypass hose, which enables the rate of flow of fluid therein to be controlled without requiring the fluid to enter the cylinder. In particular, an engine control or management system may control a rate of flow of water (or other fluid) around each cylinder to maintain a desired temperature of both the cylinder wall and the water.

The engine 100 may be configured such that preheated water (or other fluid) is injected into the combustion chamber at each expansive power stroke. This may be before combustion of the hydrogen and oxygen is initiated to provide a gas body to help control combustion, to minimise the chances of hydrogen leaking out of the combustion chamber, and to minimise the exposure of the internal surfaces of the combustion chamber to potentially damaging pure hydrogen.

Alternatively, the engine may be configured to injected water into the cylinder only when pre-determined criteria are met. As an illustrative example, water may be injected into the cylinder when the temperature within the combustion chamber reaches a specific level. Water may also be injected based upon characteristics of the engine, such as engine speed, internal temperature, engine temperature, or engine power output or load are within or outside of certain thresholds. This may be performed in a manner that does not disrupt the function of the engine as a whole, and during the same stroke that hydrogen and oxygen is added.

Similarly, the injection of water into the combustion chamber can be used without any hydrogen or oxygen, particularly in low load scenarios, to produce power for the operation of the engine and to improve fuel economy. In such case, the expansion of the steam may alone be used to apply force to the pistons or a changing selection of pistons, and this may be performed on a plurality of sequential power strokes, on alternating strokes (e.g. alternating combustion of hydrogen and oxygen with water only), or at any suitable frequency or pattern.

As outlined above, the water may be replaced or complemented by maintenance fluid, which ensures that the engine is lubricated, cleaned, protected from corrosion, or to control or adjust one or more properties or the operating conditions of components of the engine, such as the transfer of heat. As an illustrative example, the water may include or be replaced by a fluid that contains additives such as a soluble oil to lubricate the internal components of the engine, protect the internal components of the engine from corrosion, or to protect the internal components of the engine from thermal shock as the water or other fluid is injected into the combustion chamber.

Furthermore, a maintenance fluid may be used for some pre-set period before the engine is shutdown. This process could be achieved by a function similar to a turbo timer or the like. The application of such a fluid would provide the engine with additional protection from factors such as corrosion and risk of seizing during extended periods of non-operation. Such a process would also enable the harvesting of remanent heat energy which could be stored for later use.

The water may constitute recycled water from earlier combustion of hydrogen and oxygen. As such, the engine need not be provided with a supply of water, or need only be provided with a limited supply of water.

In addition to transferring excess heat from the cylinder walls and for pre-heating the water (or other fluid) injected into the cylinder, the heated water (or part thereof) can be harnessed to do useful work outside of, or peripheral to the engine.

As the engine 100 burns a substantially pure mixture of hydrogen and oxygen (rather than air, for example), the engine 100 is able to harness both the force of expansion (as outlined above) and contraction to generate more power than an engine that harnesses only expansion (or contraction). In other words, a single charge of the combustible hydrogen/oxygen mixture is able to achieve a double power stroke. This is performed using a steam condensing manifold, coupled to the discharge port 145, which is able to use a vacuum to drive the piston 115 back upwards.

Now turning back to FIG. 1, the manifold includes a vacuum branch 195, which is coupled to a steam condensing manifold. The steam condensing manifold is configurable to generate a vacuum (or low-pressure environment) which is used to drive the piston 115 upwards using the pressure differential (suction) therefrom.

Figure 3:
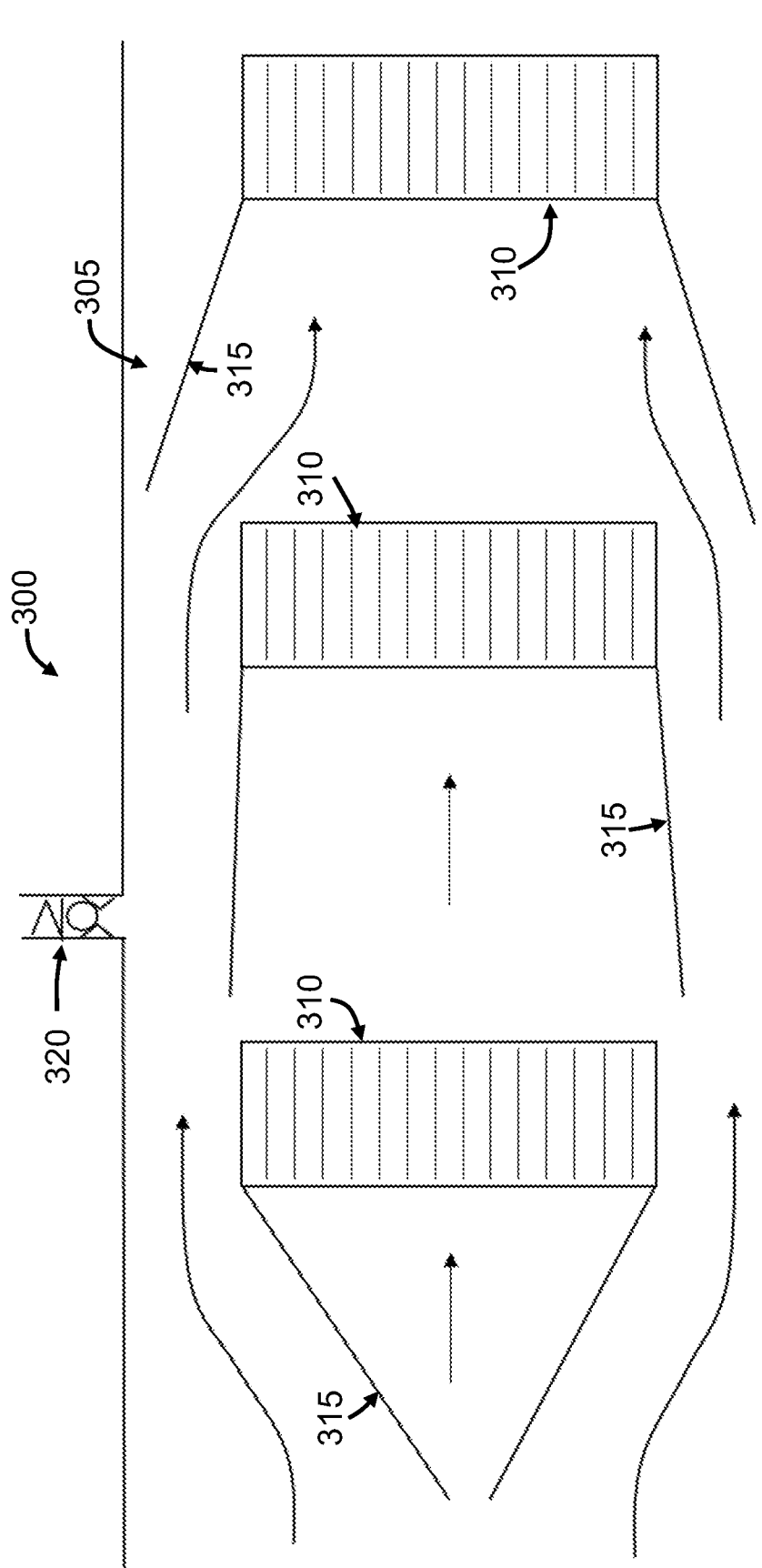
FIG. 3 illustrates a side cutaway view of a steam condensing manifold, according to an embodiment of the present invention.

FIG. 3 illustrates a side cutaway view of a steam condensing manifold 300, according to an embodiment of the present invention.

The steam condensing manifold 300 includes a steam chamber 305, which is fluidly coupled to the discharge port 145 during normal operation. As such, in normal operation steam exits the discharge port 145 and enters the chamber 305.

The chamber 305 includes a plurality of heat exchangers 310, which are configured to transfer heat from the hot steam to outside of the chamber. The heat exchangers may include transfer elements, configured to heat fluid therein, wherein the fluid is circulated outside of the chamber and either used for work, or dissipated.

As a result, the hot steam cools, and condenses into water droplets and thus significantly decreases in volume, and thus creates a low-pressure environment commonly known as a vacuum (although in practice is not a pure vacuum, but rather a low-pressure environment).

This low-pressure environment is used to draw subsequent steam from the discharge port in a subsequent cycle, and draw the piston 115 upwards, in a manner that is useful for the engine 100 to do work.

In particular, when the discharge valve 140 is open, the reduced pressure within the chamber 305 draws the superheated contents of the combustion chamber out through the discharge port.

The temperature gradient within the chamber 305 will cause the steam to migrate directly towards the coolest part of the chamber, which in itself will provide a fluid drawing effect that will assist the negative pressure within the chamber in quickly extracting the contents of the open combustion chamber and effectively drawing the piston in a manner that is beneficial to the operation of the engine.

The heat exchangers may be used to heat water, e.g. for injection into the cylinder, and may be coupled to or include a heating radiator, an absorption refrigerator boiler, a vapour compression refrigerator evaporator, an absorption refrigerator evaporator, a cool water sprinkler or the like.

Each of the heat exchangers 310 includes first and second diversion flaps 315, which are adjustable by actuators (not illustrated) to enable selective control of the flow of steam. This enables, for example, different heat exchangers 310 to be used for different tasks, and the adjustment of the diversion flaps 315 enables the heat from the steam to be prioritised between tasks.

The chamber 305 includes a ball-in-seat type one-way valve 320, which enables excess pressure in the chamber to be vented (e.g. to atmosphere), while enabling a vacuum to be maintained. In other words, the valve 320 allows pressurized fluid to escape from the chamber but does not allow atmospheric air or the like to enter. Any suitable type of one-way valve may be used, including a reed valve, and a simple flexible tube type that folds in on itself with suction. In some embodiments, multiple one-way valves may be used to enable a high flow of fluid (gas) from the chamber 305. Furthermore, a vacuum pump may be used to withdraw gases from the chamber 305, to prevent a build-up of gases. Vacuum pumps may be provided at the top and bottom of the chamber 305 to enable withdrawal of gases that are both relatively heavy and relatively light.

Finally, the chamber 305 may include a water capture discharge valve (not illustrated), enabling the condensed water to be captured, drained and used. The water capture discharge valve may be coupled to one or more water storage tanks, water transfer tanks or the like. Alternatively, the water capture discharge valve may simply release to atmosphere.

While in ideal circumstances, the steam condensing manifold will only contain steam/water, small amounts of hydrogen or oxygen may make their way into the chamber 305. This may be the case if mixture ratios are not precise, or if some of the hydrogen/oxygen is not consumed by combustion.

The engine 100 may be configured to periodically, or in response to a detected or estimated build-up of hydrogen or oxygen, purge the steam condensing manifold 300. As an illustrative example, an engine control or management system may sense the build-up of hydrogen or oxygen from one or more sensors, and purge the steam condensing manifold 300 in response thereto. Alternatively, the engine control or management system may estimate the build-up of hydrogen or oxygen (or potential build-up) based upon other factors, such as operating configuration, operating time, load parameters or the like. Alternatively, a loss of pressure differential (vacuum) within the steam condensing manifold, which could be caused by the accidental inclusion of non-condensing air, hydrogen or oxygen, may be used to determine a build-up of gases in the steam condensing manifold 300.

When purging, the engine control or management system may restrict the operation of one or more of the heat exchangers 310, causing the temperature within the steam condensing manifold 300 to rise as it is filled with superheated steam from the discharge port. The pressure within the steam condensing manifold 300 would eventually also rise, as the water remains in gaseous form, causing the one-way valve 320 to open allowing the built-up fluids in the chamber 305 to escape, thereby purging the system of any non-steam gasses.

The engine control or management system may monitor the temperature of the chamber 305 and continue to purge the gases until it deems that the system has been adequately purged of unwanted gasses. At this stage, the heat exchangers 310 are reactivated, causing the steam condensing manifold to drop in temperature, and again create a reduced pressure.

By using the steam condensing manifold 300 as described, rather than attempting to create a vacuum in the piston directly, provides several advantages. As an illustrative example, the engine 100 running at 6,000 RPM (or 12,000 strokes per minute) completes the contractive discharge stroke in about 1/200 second (5 ms). When the contractive process includes the condensing of steam, which is difficult to achieve let alone accurately time, it is difficult to create or time an optimal implosion inside the cylinder. By providing an external steam cooling system, adequate time can be taken to achieve condensation of the said steam even at high engine speed. Furthermore, the use of the steam condensing manifold 300 not only provides a contractive power stroke, but also helps in evacuating the steam from the cylinder.

While a single cylinder is illustrated in connection with the steam condensing manifold, multiple cylinders may be coupled to a single steam condensing manifold. This enables the condensed steam from one cylinder to help evacuate steam (and work by vacuum with) another cylinder. Similarly, a plurality of steam condensing manifolds may be provided, either each in associated with a cylinder, group of cylinders, or multiple steam condensing manifolds may be associated with a single cylinder.

Turning back to FIG. 1, an engine braking valve 200 is provided in the discharge manifold 150, to enable the engine to brake. In particular, when closed, the engine braking valve 200 prevents or restricts the flow of steam from the discharge port 145 to continue further into the discharge manifold 150 into the steam condensing manifold 300. This in turn creates a temporary compression stroke, where the stream is compressed by the discharge stroke of the piston 115, providing resistance to the rotation of the engine.

The valve 200 may comprise an offset butterfly valve that can be springingly attached to a sliding rack or the like that is activated when there is a need to slow the speed of the engine against some external driving force. As the pressure builds before the valve 200, movement of the piston 115 will be opposed by the contained gas mixture.

The valve 200 may be operated at a constant rate (e.g. closed during each discharge stroke), or at a variable rate (e.g. modulated at a particular frequency) to provide a desired level of engine braking. Similarly, the valve may be configured to open when the contained steam reaches a pre-set or dynamic limit, thereby allowing steam to escape into the steam condensing manifold.

The engine 100 may further be configured to inject pre-heated water (or other liquid) into the cylinder to facilitate engine braking. In such case, the water is injected into the cylinder when (or near when) the piston at bottom dead centre. Leading up to the injection event the expansive action of the piston moving towards bottom dead centre without any fluids entering the growing void of the expanding chamber, will in fact create a negative pressure working against the movement of the engine. Towards bottom dead centre when the injected water turns into steam as it comes into contact with the superheated internal components of the combustion chamber, an increase in pressure in the cylinder is provided. Water may continue to be injected as the piston moves upwards, such that the steam produced will continue to rise in pressure and apply a resisting force to the piston in a manner opposing its direction of travel.

As such, water may be injected to generate steam that drives the piston, or to generate steam that works against the movement of the piston, to thereby provide engine braking.

Alternatively or additionally, the valve 140 may be configurable to be closed during the contraction stroke (i.e. upwards movement of the piston), to thereby work against movement of the piston, much like a compression stroke of a conventional engine, but with the steam product of the combustion of the hydrogen and oxygen, or the steam provided through injection of water into the cylinder, as described above. This is particularly relevant for camless valve embodiments, where the valve 140 is electrically controlled. In this case, at a specific point before top dead centre, the discharge valves are opened to release the compressed fluid before it could assist the downward movement of the piston during the expansion stroke.

In addition to creating a vacuum in the steam condensing manifold 300, the steam may also be used to directly perform work, such as run an air compressor.

The manifold 150 includes a pressure branch 205 which enables such work. The manifold further includes first and second valves 210a, 210b to control a passage of flow either along the vacuum branch 195 or pressure branch 205. The first valve 210a is illustrated in an open configuration and the second valve 210b is illustrated in a closed configuration.

While not illustrated, specific bodies of material may be provided within the combustion chamber to absorb the heat of combustion and store it in a form that will cause the injected water to boil/expand and thus more efficiently provide a driving force to the reciprocating piston 115. The bodies may also assist in maintaining a stable temperature within the cylinder, even when water is injected.

In other embodiments, an engine is provided that includes multiple valves per cylinder. As outlined in further detail below, this enables the crankshaft and camshaft to be rotated at the same speed as a traditional four stroke engine (i.e. the camshaft operating at half the speed of the crankshaft), and each valve is only opened every second crank rotation. This is particularly useful when an engine is converted from an existing four-stroke engine, and that it enables existing crank and camshaft components to be used.

FIGS. 4a-4h illustrates an operation of an engine 400 in one such configuration, according to an embodiment of the present invention. The engine 400 is similar to the engine 100, but includes two valves 140a, 140b and two discharge ports 145a, 145b per cylinder, and wherein the camshaft (not illustrated) rotates at half the speed of the crankshaft. The two discharge ports 145a, 145b may be coupled to a single discharge manifold and a single steam condensing manifold, and thus function similar to the engine 100.

In FIG. 4a, the piston 115 is at top dead centre, and the discharge valves 140a, 140b are closed. Hydrogen and oxygen are injected into the cylinder such that there is excess oxygen to provide a buffer for the oxygen that is initially ignited, as outlined above in relation to the engine 100. The spark plug ignites the hydrogen and oxygen mixture in the combustion chamber, which forces the piston 115 downwards in a controlled manner due to the presence of the excess oxygen acting as a buffer.

As the piston 115 moves downwards, further hydrogen (and potentially further oxygen) is added to the chamber, providing fuel to the already existing combustion, again much like in the engine 100 and as illustrated in FIG. 4b. The valves 140a, 140b remain closed, and as such, the further combustion continues to push the piston 115 downwards.

As the piston 115 approaches bottom dead centre, the mixture of hydrogen and oxygen reaches stoichiometric proportions and ends without any oxygen or hydrogen remaining in the cylinder, and the first discharge valve 140a opens, enabling the combustion product (i.e. steam) to escape through the first discharge port 145a, as outlined in FIG. 4c.

As the piston 115 travels upwards (i.e. towards the discharge valves 140a, 140b and top dead centre), the first discharge valve 140a remains open, and thus the combustion product (i.e. steam) continues to exit through the first discharge port 145a.

As the piston 115 approaches top dead centre, and as substantially all of the combustion product (i.e. steam) has left the cylinder) the first discharge valve 140a closes. Hydrogen and oxygen are again injected into the cylinder such that there is excess oxygen to provide a buffer for the hydrogen that is initially ignited, as illustrated in FIG. 4e.

This again forces the piston 115 downwards in a controlled manner due to the presence of the excess oxygen acting as a buffer, and as the piston 115 moves downwards, further hydrogen (and potentially further oxygen) is added to the chamber, providing fuel and potentially oxidant to the already existing combustion, again much like in the engine 100 and as illustrated in FIG. 4f.

As the piston 115 approaches bottom dead centre, the mixture of hydrogen and oxygen reaches stoichiometric proportions and ends without any oxygen or hydrogen remaining in the cylinder, and the second discharge valve 140b opens, enabling the combustion product (i.e. steam) to escape through the second discharge port 145a, as outlined in FIG. 4g.

As the piston 115 travels upwards (i.e. towards the discharge valves 140a, 140b and top dead centre), the second discharge valve 140b remains open, and thus the combustion product (i.e. steam) continues to exit through the second discharge port 145b.

As the piston 115 approaches top dead centre, and as substantially all of the combustion product (i.e. steam) has left the cylinder) the second discharge valve 140b closes and the process is repeated through injection of hydrogen and oxygen as illustrated in FIG. 4a. As such, the cycle of the engine 400 includes a power stroke (downwards movement of the piston 115) and a discharge stroke (upwards movement of the piston 115) for each revolution of the crankshaft, but only a half revolution of the camshaft, causing the first and second discharge valves 140a, 140b to operate alternately.

Those skilled in the art will appreciate that the same process could employ the use some blend of hydrogen, fossil fuel, organic fuel, oxidant mixtures, water/steam and compressed air resulting in the same or similar operational outcomes and remaining within the scope of the current invention.

While the above embodiments do not require an air intake (as atmospheric air is not used in the combustion process), in other embodiments, an engine may be provided including an air intake, which is used to compress air in engine braking or air compression modes, for example.

Figure 5B:
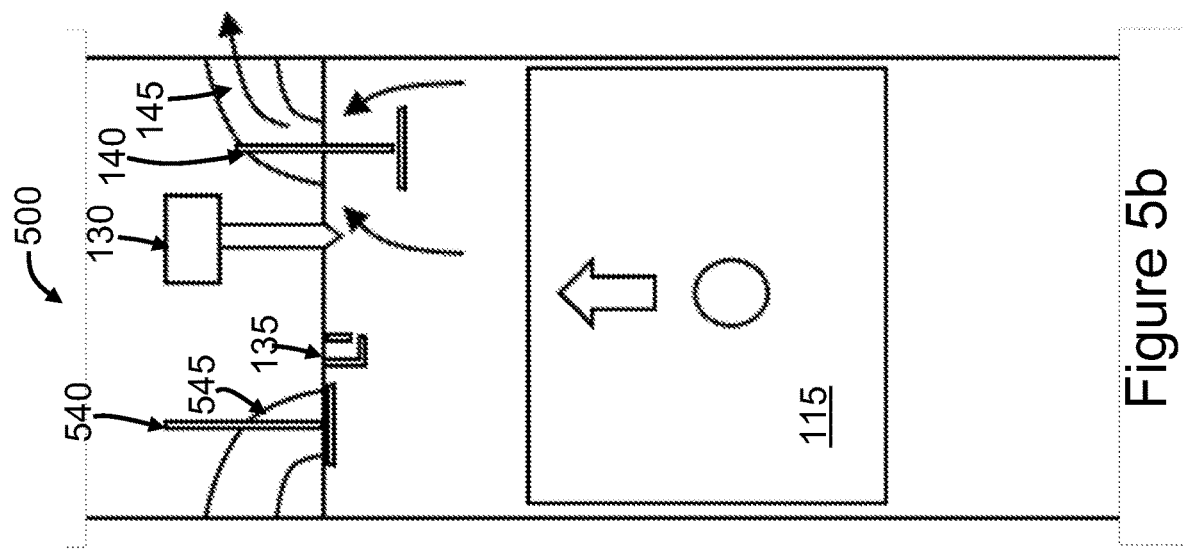
FIG. 5a-5b illustrate operation of an engine in an air compression configuration, according to an embodiment of the present invention.
Figure 5A:
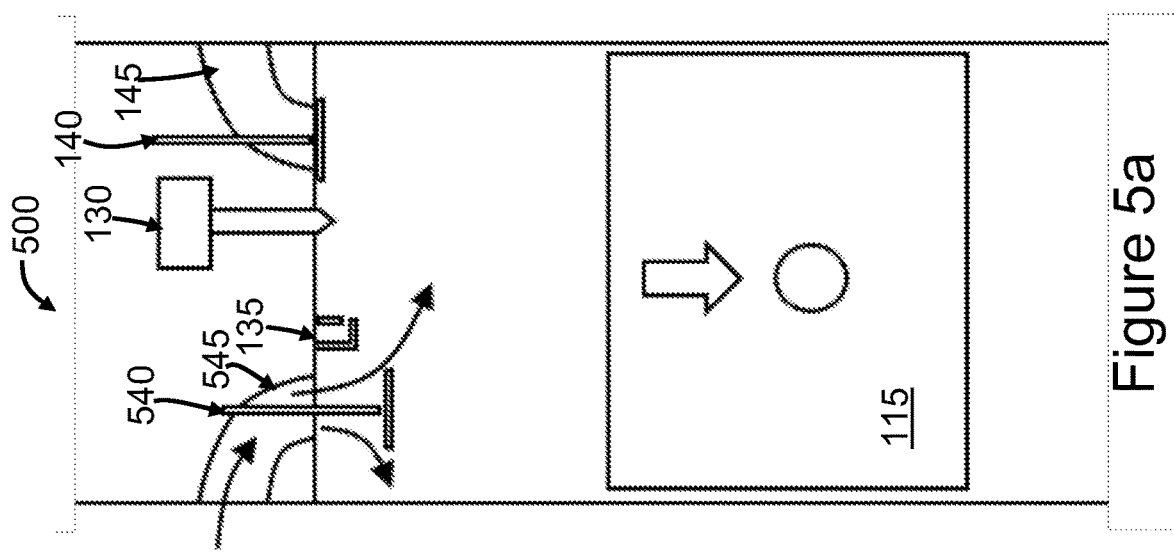

FIG. 5a illustrates operation of an engine 500 in an air compression configuration, according to an embodiment of the present invention. The engine 500 is similar to the engine 100, but includes an intake valve 540 and an intake port 545 per cylinder.

The intake valve 540 may be closed during normal operation of the engine 500, and as such, the engine 500 may operate in the same way as the engine 100 as illustrated in FIGS. 1 and 2. The intake valve 540 may be selectively opened to enable the piston 115 to draw in air for compression, as outlined below.

In such compression mode, the intake valve 540 is open as the piston 115 travels downwards, and thus causing air to be drawn into the cylinder through the intake port 545, as illustrated in FIG. 5a. As the piston 115 reaches bottom dead centre, the intake valve 540 closes, and the discharge valve 140 opens, thus causing the air to be forced out of the cylinder through the discharge port 145, as illustrated in FIG. 5b. The intake valve may be adjusted to close near bottom, e.g. slightly before or after the bottom, to enable more air to be drawn into the cylinder using a natural compression of the air in the cylinder as it hits the piston.

When the engine is configured to provide engine braking while in such air compression mode, timing of the intake valve may be adjusted to not only provide air compression, but to maximise engine braking. As an illustrative example, the intake valve may be closed at the beginning of the air intake stroke (i.e. when the piston is moving downwards), thereby creating a vacuum in the cylinder which assists in engine braking. The intake valve will then open, which will result in a "rush" of intake air through the opening valve into the combustion chamber. Depending on a timing of the intake valve, this may even lead to greater volume of intake air within the chamber than at atmospheric pressure. The intake valve is then closed, and this trapped air is compressed by the contracting piston, and in the case of a greater volume of air, creates larger braking forces for the engine and a more productive compressor.

A discharge manifold, such as the discharge manifold 150, may couple the air being output by the cylinder to a compressed air reservoir or tank, for example, or discharged to atmosphere. In such case, the steam condensing manifold may be fluidly disconnected from the discharge ports by isolation valves, to prevent compressed air from entering the steam condensing manifold.

As such, piston is used to compress the air for storage in the compressed air reservoir or tank, the stroke essentially becomes an air compression stroke. As the piston compresses the air in this air compression stroke, it may also be used for engine braking, as resistive force is applied by the piston to the crankshaft.

While there exist systems, such as electronic and camless valve timing systems, that may change the valve timing to convert the engine between hydrogen/oxygen operation to air compressor operation, it is in many cases desirable to be able to provide simpler and more cost-effective valve timing systems, particularly in the context of small, mass-produced engines.

Figure 6:
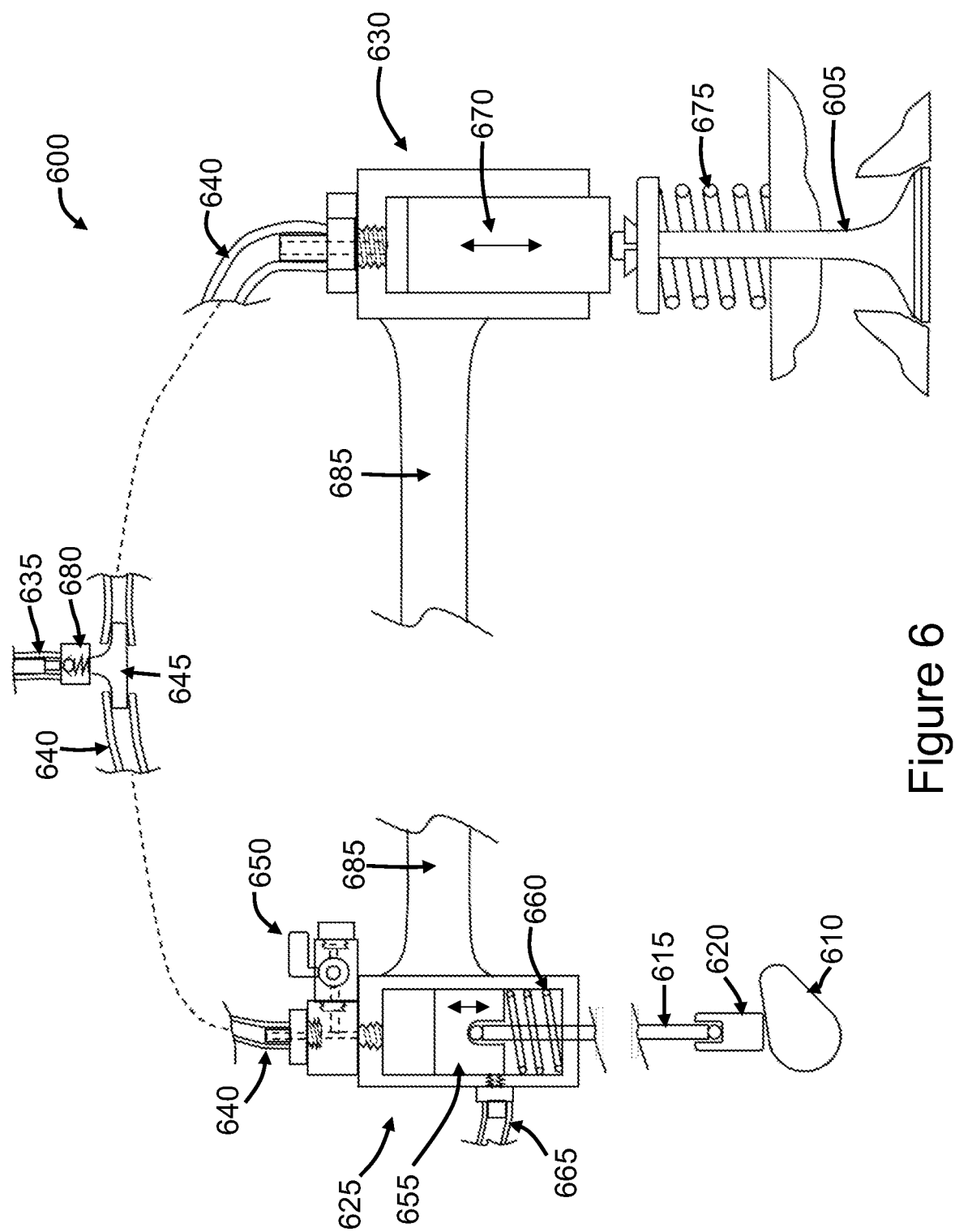
FIG. 6 illustrates a portion of an engine, according to an embodiment of the present invention.

FIG. 6 illustrates a portion of an engine 600, according to an embodiment of the present invention. The engine 600 is similar to the engine 100, but includes hydraulically controlled intake valves 605, to enable the engine to selectively operate in a normal fuel combustion mode, and in an air compressor mode. In short, the standard rocker for an intake valve has been replaced by a master/slave cylinder assembly, as outlined below.

The engine includes a camshaft 610, which rotates around its axis, to thereby push a pushrod 615 using a cam follower 620, much like a conventional 4-stroke pushrod engine. The pushrod 615, however, selectively engages with a master cylinder 625, which is hydraulically coupled to a slave cylinder 630, to thereby engage the intake valve 605.

The engine 600 includes an oil feed line 635, which provides pressurised engine oil to the master cylinder 625 and the slave cylinder 630 using first and second lines 640 and a T-junction 645.

During normal (non-compressor) mode, an oil return valve 650 is open, allowing oil to dump through an orifice thereof and return to a sump of the engine. As the oil is able to dump through the orifice, no significant pressure builds up in the lines 640 or in either the master or slave cylinders 625, 630.

The master cylinder 625 includes a piston 655 biased upwardly with a return spring 660. When the oil return valve 650 is open, the spring 660 lifts the piston 655, due to the lack of oil pressure there above, opening a discharge valve dump port 665. The pushrod 615 is coupled to the piston 655, and as a result, the cam follower 620 and pushrod 615 are lifted out of engagement of the camshaft 610.

Similarly, the slave cylinder 630 includes a piston 670, which engages with an upper surface of the valve 605 and is biased upwardly by the valve 605 and its associated valve spring 675. While the oil return valve 650 is open (i.e. during normal operation), a small amount of back pressure caused by the orifice of the valve 650 keeps the piston 670 in contact with the intake valve 605, but without compressing the valve spring 675. As such, the intake valve 605 remains closed as no air is used or needed in the combustion of hydrogen and oxygen in such normal operation.

The on-going supply of engine oil keeps the master and slave cylinders 625, 630, and the lines, full of oil and primed for engagement as required. Furthermore, the orifice of the valve 650 may be provided such that sufficient pressure is provided such that a lubricating amount of bypass oil is able to protect and lubricate the pistons 655, 670 and prevent seizing in their respective bores.

When air compressor mode of operation is required, the valve 650 is closed, causing the pressure within the lines 640 and in the master and slave cylinders to build up toward the pressure of the oil feed. The build-up of pressure on the piston 655 forces the spring 660 to compress, forcing the piston 655 downwards such that the pushrod 615 and follower 620 are in mechanical engagement with camshaft 610. As the camshaft 610 rotates, it will lift the piston 655 by the pushrod 615/follower 620 and cause a rapid rise in pressure in the master cylinder 625, thereby into the lines 640 and over to the slave cylinder 630. A one-way valve 680 prevents the rise in oil pressure from migrating backwards into the oil feed line 635.

The increase in oil pressure at the slave cylinder 630 forces the valve spring 675 to compress and the intake valve 605 opens allowing intake air to be drawn into the engine cylinder (not shown).

As the camshaft 610 continues to rotate, the piston 655 lowers, causing a decrease in pressure in the master cylinder 625, the lines 640, and ultimately in the slave cylinder 630. This decrease in pressure enables the valve spring 675 to again force the valve 605 and piston 670 upwards, thus closing the valve.

As such, the engine 600 provides a simple and cost-effective way to enable the intake valve 605 to be selectively opened in synchronisation with the camshaft when needed in air compression mode, but inactive when in normal mode.

While not illustrated, the master and slave cylinders 625, 630 may be fixed to the cylinder head by solid shafts 685.

In an alternative embodiment, the engine may comprise an overhead camshaft engine, and in such case a cam follower may replace the pushrod 615 to engage with the master cylinder 625.

As illustrated with reference to FIG. 6, while the port 665 is open, the discharge valve closing retard system (shown in FIG. 7), which is useful when in compression mode only, is prevented from engaging.

In normal operating mode of an engine, the discharge valve may be configured to close at a pre-set point before TDC (e.g. up to 41 degrees before TDC), to ensure that the valve is fully closed by the time hydrogen and oxygen is injected, and/or to enable hydrogen and oxygen to be injected (or start being injected) slightly before TDC. However, during air compression mode, efficiency is lost if the discharge valve is closed before all capture air has been expelled. As such, it is desirable to be able to delay closing of the discharge valves in air compression mode until or around TDC.

FIG. 7 illustrates another portion of the engine 600, which allows the valve train to selectively retard the closing time of the discharge valve in a simple and cost-effective manner.

In particular, a discharge valve 705 is biased in a closed position by a valve spring 710, and is opened by pivoting rocker 715, which follows a camshaft (not shown). As one side of the rocker 715 is forced upwards (e.g. by a pushrod), the other side presses down onto the valve 705, thereby opening the discharge valve 705. In normal operation, the opening and closing of the discharge valves operates solely based upon the rotation of the camshaft in such manner.

An oil feed line 720 provides pressurised engine oil through a one-way valve 725 and a T-junction 730 to first and second lines 735. One of the lines 735 is coupled to the discharge valve dump port 665, illustrated in FIG. 6, and the other of the lines 735 is coupled to a retarding cylinder assembly 740.

During normal (non-air compressing) mode, engine oil from the oil feed line 720 flows through the line 735 and to the dump port 665, of FIG. 6, and through an open oil return valve 745 the where it is dumped. The oil return valve 745 provides a small amount of resistance, which maintains a low oil pressure in the lines 735.

The retarding cylinder assembly 740 includes a retarding piston 750, which is biased upwards using a return spring 755. The small amount of pressure in the lines ensures that the retarding piston 750 is lubricated and primed, but not enough to compress return spring 755. As such, the retarding cylinder assembly 740 does not provide any pressure to the rocker 715 in such configuration, enabling the valve to be opened and closed based upon a rotation of the camshaft alone.

When engine braking/air compression mode is selected, the oil return valve 745 is closed, preventing oil from being dumped therethrough. In conjunction with this, the oil return valve 650 of FIG. 6 is closed. As the piston 655 is pushed downwards, it closes the discharge valve dump port 665. The pressure within the retarding cylinder assembly 740 increases, causing the piston 750 to move downwards compressing the return spring 755 bringing a piston extension 760 into mechanical contact with rocker 715.

As the lifting action of the camshaft (not shown) causes the rocker 715 to open the discharge valve 705, the piston 750/piston extension 760 follows the movement of the pivoting rocker 715.

As the rotating camshaft moves past its point of maximum lift, which would typically allow the rocker 715 to pivot back thereby allowing the valve to close, the piston extension 760 prevents the rocker 715 from lifting, thereby keeping the valve 705 open at least partially. In particular, the oil contained in retarding cylinder assembly 740 and lines 735 has sufficient pressure, due to the one-way valve 725 and the closed port 745, to prevent the piston 750 from contracting, thus preventing rocker 217 from allowing engine valve 220 from closing completely.

At a point near TDC, where the lifting action of the camshaft 610 of FIG. 6 causes the piston 655 to lift and open the dump port 665, the oil contained in the retarding cylinder assembly 740 can pass through the open dump port 665, allowing the retarding piston 750 to contract and in turn allowing discharge valve 705 to close.

When air compressor mode is no longer required, valve 650 of FIG. 6 and the valve 745 of FIG. 7 are opened, allowing both the intake valves 605 and retardation of the discharge valves to be disengaged.

The compressed air, which as outlined above, may be stored in tanks, may be used to drive the engine (the injector 130 may inject compressed air into the cylinder instead of hydrogen and oxygen for one or more cycles), which may be used to cool the engine, or provide a fuel-efficient mode of operation (e.g. in low load situations). Alternatively, the air may be injected when the piston is at or near bottom dead centre to provide engine braking in a similar manner to the steam-based engine braking described above. The air may also be used to perform work, such as to drive an alternator or the like, to power the production of hydrogen and oxygen for later use by the engine as a fuel supply.

The discharge valve 140 may be configured to open later (e.g. near top dead centre) to thereby provide compression directly in the cylinder, which can be useful to provide engine braking. In such case, the compression of the air inside the cylinder works against the upward movement of the piston, thereby providing engine braking in a similar manner to a four-stroke engine (but potentially on every upstroke of the piston, rather than every second upstroke)

When engine braking is required, any combination of steam or air-based engine braking may be used, as may combustion-based engine braking (e.g. when a steam product of combustion is used to slow engine motion). In some embodiments, combustion based and non-combustion based braking may be used to ensure that engine temperatures do not drop too low.

The engines described above may be purpose built engines. However, existing four-stroke engines may be converted to engines similar or identical to those outlined above. In one scenario, the cylinder head of an existing engine may be replaced to include the injector/port arrangements described above. Existing intake and exhaust manifolds may be removed and replaced by a discharge manifold and associated components. Alternatively, the cylinder head may be modified to include the injectors, and existing intake ports may be repurposed as discharge ports. In applications where there is a need for air compression and or engine braking modes of operation, the air intake system may be left in place. A new camshaft or camshafts may be used to adjust the timing of the valves according to the new operation.

In some embodiments, a four-stroke engine is converted to an engine according to an embodiment of the present invention using a double-lobe camshaft. In particular, the double-lobe camshaft may include two lobes per section, causing the respective valve to be opened twice per camshaft rotation. This is particularly beneficial as existing four-stroke engines generally have a camshaft that operates at half the speed of the crankshaft, and such double-lobe camshaft enables the engine valves to be opened once per crankshaft revolution, which suits the operation of a twin stroke engine.

FIG. 8 illustrates a cross sectional view of a portion of a camshaft 800, according to an embodiment of the present invention.

The camshaft 800 includes two raised sections 805, at a single point along its length, and thus comprises a lobe having two noses. Both raised sections 805 share a common centre line and positioned on opposing sides of the camshaft 800. As a result, a cam follower 810 is lifted twice per rotation of the camshaft.

Both raised sections 805 are exact counterparts, and the camshaft has rotational symmetry, and therefore the raised sections 805 result in identical valve operation. The camshaft is symmetrical around the centre line of the lobes 805 (i.e. from nose to nose) meaning that the opening ramps 815a and closing ramps 815b are exact counterparts, but in other embodiments the opening ramps 815a and closing ramps 815b may have different profiles. Similarly, the camshaft is symmetrical in a directly perpendicular to the centre line of the lobes 805.

The camshaft 800 is particularly useful in converting an existing four-stroke engine to an engine according to an embodiment of the present invention, as it enables the timing of the camshaft relative to the crankshaft to be maintained, while having valves opening in every cycle of the crankshaft.

Alternatively, the cam shaft speed could be doubled to align with crankshaft speed negating the need to use double nosed lobes. While halving the size of the camshaft sprockets/pulleys would be a relatively simple operation on an engine with a timing chain/belt, changing the size of timing gears could require modifications to or replacement of the timing cover of a gear timed engine. As such, the method adopted to double the speed of valve operation to suit the new twin stroke cycle could vary between host engine types.

The engines described above may be used for any suitable purpose, including in a motor vehicle, in a generator, a pump, in machinery, or anywhere where an engine is used.

Figure 9:
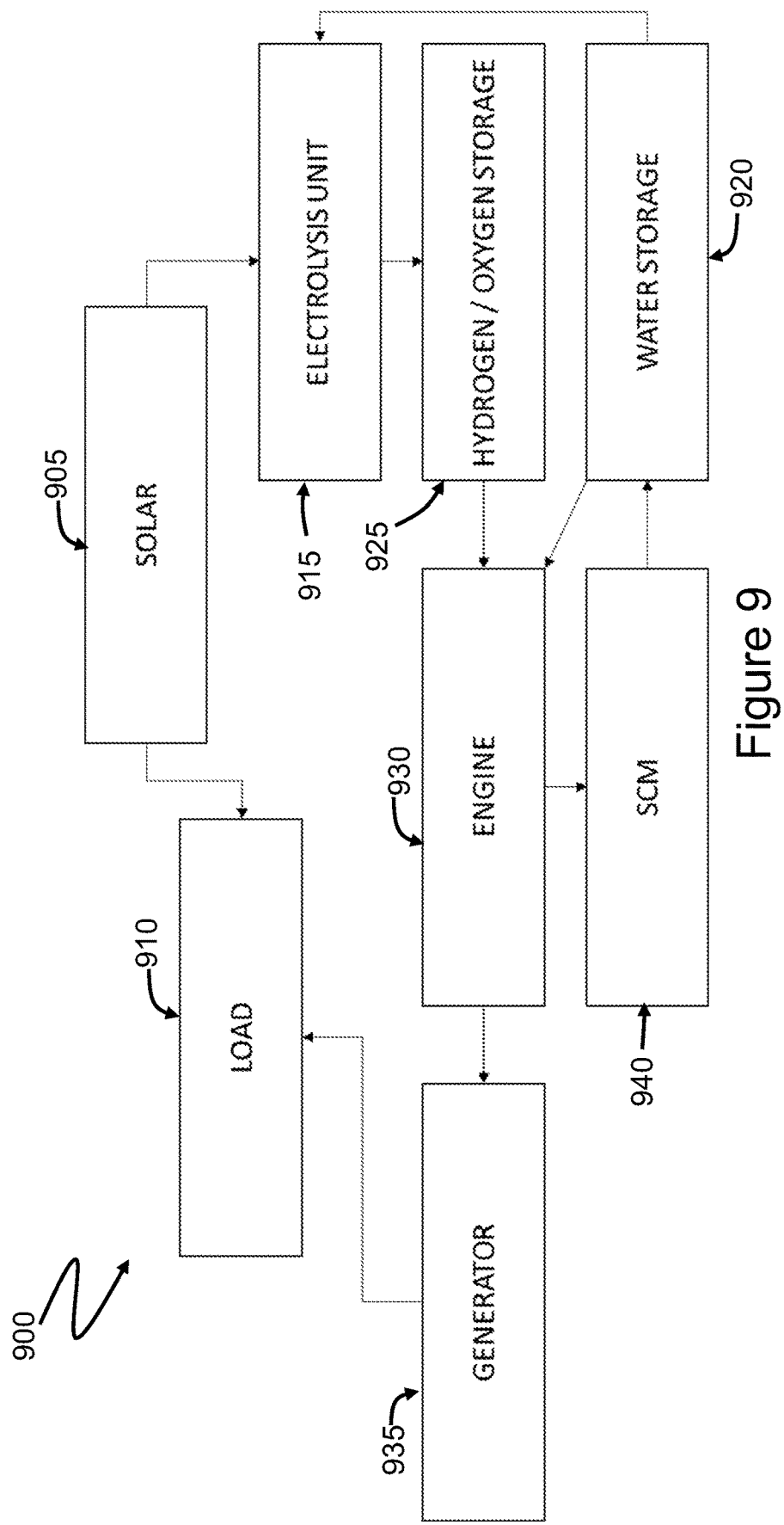
FIG. 9 schematically illustrates an exemplary use case of an engine, according to an embodiment of the present invention.

FIG. 9 schematically illustrates an exemplary use case 900, according to an embodiment of the present invention.

Solar panels 905 are used to power a load 910, such as a load of a factory, a residential property or the like, when available.

Any excess power generated by the solar panels 905 is used to power an electrolysis unit 915, which is configured to generate hydrogen and oxygen from water from water storage 920. The generated hydrogen and oxygen are stored in separate hydrogen/oxygen storage 925 (e.g. tanks) for later use.

When the load 910 is unable to be supplied by the solar 905, an engine 930, powered by the hydrogen and oxygen, is used to power a generator 935 which in turn powers the load 910. The engine 930 may be similar or identical to the engine 100, 400 or 500 above.

The engine 930 is coupled to a steam condensing manifold 940, similar or identical to the steam condensing manifold 300, which condenses water from the steam produced by the combustion of the hydrogen and oxygen. This condensed water is not only used to generate a vacuum applied to the engine 930, as outlined above, but also supplies water to the water storage 920, for use in generating further hydrogen and oxygen.

The use of solar panels 905 to decompose water into hydrogen and oxygen is attractive as it eliminates the need for expensive batteries and inverters.

A similar example may be provided where the solar panels 905 are replaced or augmented by wind power (e.g. one or more wind turbines).

Alternatively, solar energy can be used to directly split water into hydrogen and oxygen.

Another example use of the present invention is the provision of power in remote areas. In particular, the use of solar panels, much like that illustrated above, can be used to locally generate fuel, for use locally. This avoids the need for expensive transport of fuel from externally, and enables a self-sustaining financial ecosystem to be provided.

Furthermore, money spent by travellers and locals on the hydrogen and oxygen may be used to sustain local people in local jobs, rather than pay for expensive transport, which doesn't benefit the local community. A further advantage is that the hydrogen and oxygen used in the engines described is clean, and does not pollute, making it particularly suited to fragile environments.

Figure 10:
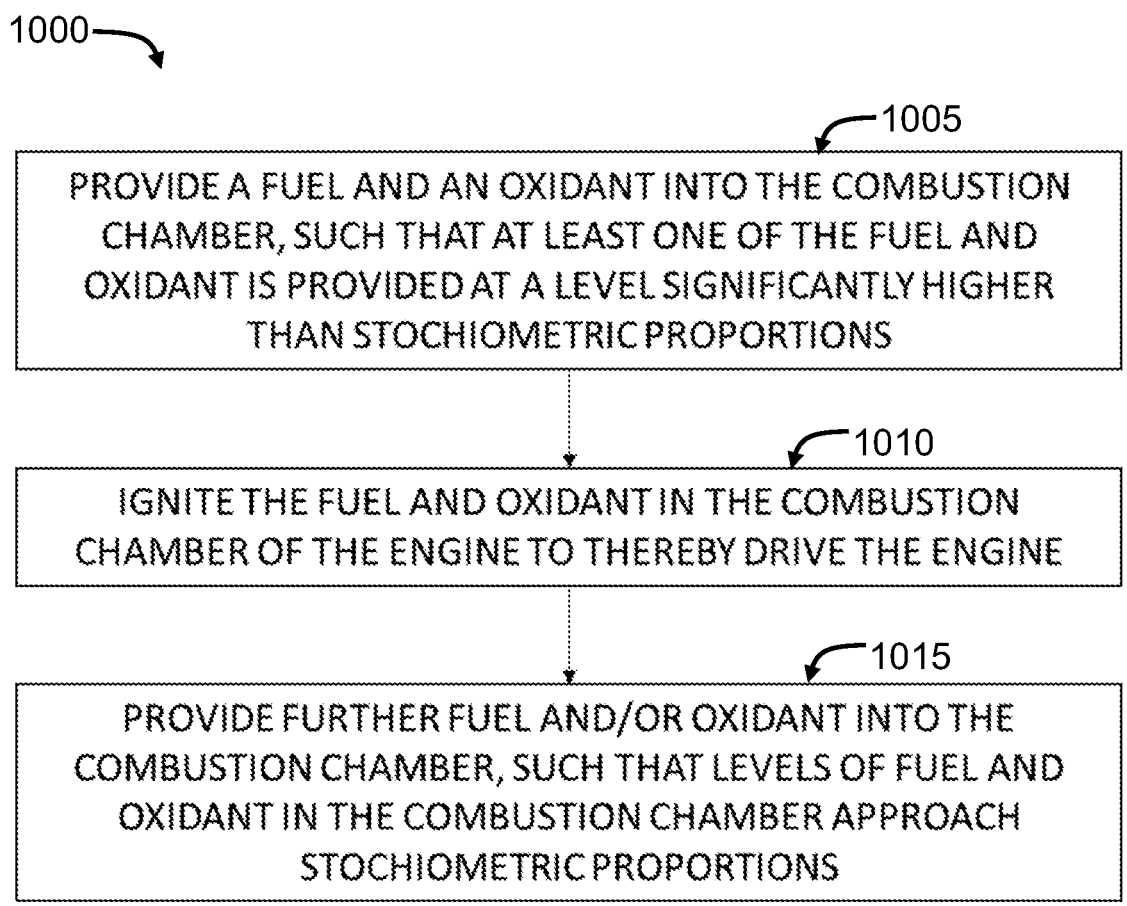
FIG. 10 illustrates a method of operating an internal combustion engine, according to an embodiment of the present invention.

FIG. 10 illustrates a method of operating an internal combustion engine, according to an embodiment of the present invention.

At step 1005, a fuel and an oxidant are initially provided into the combustion chamber, such that at least one of the fuel and oxidant is provided at a level significantly higher than stochiometric proportions, to thereby act as a buffer for initial combustion of the fuel and oxidant.

At step 1010, the fuel and oxidant in the combustion chamber of the engine are ignited to thereby drive the engine. The excess fuel or oxidant functions as a buffer, as outlined above.

At step 1015, and subsequently to igniting the fuel and oxidant, further fuel and/or oxidant is provided into the combustion chamber, such that levels of fuel and oxidant in the combustion chamber approach stochiometric proportions, and such that when combustion is complete, substantially all of the fuel and oxidant has been combusted.

The method 1000 may be similar or identical to the methods used in the engines described above.

In addition to the functions described above, the engine may be configured to run on compressed air and carbon fuels, such as LPG, ethanol, petrol, diesel or biofuels. This enables the engine to be used in areas where hydrogen is not able to be used, or is not desirable to be used. Alternatively, carbon-based fuels may be used outside of built up areas, and clean hydrogen and oxygen based fuels used in built up areas, or areas sensitive to pollution.

In some embodiments, a fuel is combusted together with a mixture of hydrogen and oxygen, whereby the hydrogen and oxygen may assist in the combustion of the fuel. As such, low quality or difficult to burn fuel can be used together with hydrogen and oxygen to improve performance of the engine.

As an illustrative example, ethanol is generally inefficient in engines that do not have high compression ratios, and pure (or substantially pure) ethanol is generally not suitable for starting engines in cold conditions. As such, ethanol/petrol blends are provided, which are altered in summer and winter to provide fuel suitable to the prevailing conditions. In such cases, hydrogen and oxygen may be combusted together with ethanol to enable better cold starting, and to increase the efficiency of the combustion of ethanol.

Similarly, substances such as tallows made from animal fats have similar energy density per volume as conventional diesel and petrol, but are generally not suitable for internal combustion engines as they have much higher ignition temperatures compared to fossil fuels. The use of tallow, together with a mixture of hydrogen and oxygen may allow the tallow to be usable in an engine.

While the engine has been described above with reference to a single cylinder, the skilled addressee will appreciate that in many scenarios, a multi-cylinder engine will be used. In particular, the engine may include a plurality of cylinders, wherein each cylinder is selectively configurable to operate in one or more operating modes. In such case, the cylinders may each include a piston configured to drive a common crankshaft.

As an illustrative example, the engine may be configured to inject water into cylinders on alternate cycles, such that a first bank of cylinders operates on water/steam only for a cycle, and a second bank of cylinders operates on combustion of fuel and oxidant for a cycle. Similarly, the engine may be configured to compress air using one or more cylinders, while combusting fuel and oxidant in one or more other cylinders.

An electronic control unit (ECU) may be used to control the injection of oxygen and hydrogen and other fluids throughout the engine cycles. The ECU may measure, control and adjust the injection of the oxygen and hydrogen throughout the engine cycle. For example, the length of time or amount of gases injected may be adjusted to react to the changes in parameters or conditions.

The ECU may control other aspects of the engine, such as the opening and closing of valves to facilitate air compression modes, to control the injection of water (or other fluids) to facilitate steam modes, and to facilitate engine braking.

While the above has been described primarily with a piston and cylinder, the skilled addressee will readily appreciate that aspects of the invention may be applied to other types of internal combustion engines, including rotor based engines.

Furthermore, while a single piston is shown, a plurality of pistons may slide sealingly inside bores provided within a single engine block to drive a single crank or drive shaft. The pistons may be in any suitable arrangement, including an inline arrangement, a V-arrangement, or a flat (opposing) arrangement.

While hydrogen and oxygen are described, the skilled addressee will readily appreciate that other fuels and oxidants may be used. Similarly, the hydrogen and oxygen may be supplemented with other fuel gas mixtures, including petrol and air, thus enabling the engine to also operate in a similar manner to a traditional four-stroke engine. The fuel mixture may include a fossil and or organic fuel and some combination of buffer/expandant/other gases including atmospheric air.

The atmospheric air (or other gas) may be pressurised before it enters the combustion chamber, or be drawn in through an intake, much like a traditional four-stroke engine and utilise a compression stroke. Any buffer gas added to the combustion chamber may be pre-heated, and in one embodiment is pre-heated such that it reach the ignition temperature of a fuel such as diesel.

Unlike a conventional two-stroke engine with an induction, compression, power, exhaust sequence contained in two strokes of a piston, the engines and methods described above utilise a full power stroke followed by an exhaust stroke.

Advantageously, the engines described above are able to operate in a mode without a compression stroke, which increases efficiency over traditional engines. Furthermore, the cycle of the engines may consist of an expansive power stroke followed directly by a contractive power stroke, further increasing efficiency over traditional engines.

The use one of the combustion gases initially in excess to provide a buffer that enables the engine to avoid a destructive shock wave at ignition, without having a buffer that remains after combustion is completed. This enables the contractive power stroke to be utilised.

Advantageously, the steam condensing manifold enables a contractive power stroke from outside of the cylinder, which assists in evacuation of combustion product from the cylinder, and alleviates the need for the contraction phase to be well timed with the movement of the piston, which is difficult, particularly in a fast moving and variable speed engine.

Furthermore, the use of the steam condensing manifold allows extra time for the superheated combustion chamber steam to be cooled to a condensing stage. For example, in an engine operating at 6000 RPM, steam would need to condense in less than $1/200^{th}$ of a second to condense while still in the cylinder, which is difficult to achieve, whereas that same cylinder of steam may take more than 1 second to be drawn out of the cylinder towards the coldest part of the SCM and condense there.

As the engines are able to run without a traditional compression stroke, no compressive losses nor wasted travel is provided, which continually generates power without any wasted movement.

As the buffers used to convert the heat of initial combustion into controlled expansion are removed (through later combustion), no harmful bi-products are generated. This is in clear contrast to the use of air, where nitrogen is used as a buffer, which can cause harmful bi-products to be generated. Similarly, when water is used as a buffer, it is not chemically involved with the fuel or oxidant (or chemically in the combustion at all), which also avoids the generation of harmful bi-products.

Finally, the engines outlined above provide engine braking capabilities like a compression generating internal combustion engine does. In the past, engines without a compression cycle engines have not been suitable for applications such as loaded trucks descending big, long hills where wheel brakes quickly overheat, high speed vehicles continually needing to brake hard, or motor cycles in vertical balance situations such as riding on the back wheel due to their lack of engine braking capabilities.

Furthermore, engine braking may be provided in a manner that compresses air, which may later be used to drive the engine. As such, the engine braking may be regenerative in that the compression of air used to brake the engine is later able to be used to drive the engine.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An internal combustion engine comprising a combustion chamber, wherein the engine is configurable to operate in:
    a compressionless operating mode where the engine is at least partly driven by combustion of fuel and oxidant in the combustion chamber without compression of the fuel and the oxidant by a compression stroke of the engine without using any piston to compress the fuel and the oxidant, wherein the oxidant is at least one of air or oxygen; and
    a compression generating operating mode where the engine is at least partly used to compress a fluid in the combustion chamber using at least one piston to compress the fluid, wherein the fluid includes at least one of air or steam, and discharge the fluid that has been compressed without any fuel in the combustion chamber.

2. The internal combustion engine of claim 1, wherein the engine is configurable to switch between the compressionless operating mode and the compression generating operating mode while the engine is running.

3. The internal combustion engine of claim 1, wherein in the compression generating operating mode the contents of the combustion chamber does not include a fuel.

4. The internal combustion engine of claim 1 wherein in the compressionless operating mode the engine is configured to:
    initially provide the fuel and the oxidant into the combustion chamber, such that at least one of the fuel and oxidant is provided at a level significantly higher than stochiometric proportions, to thereby act as a buffer for initial combustion of the fuel and oxidant;
    ignite the fuel and oxidant in the combustion chamber of the engine to thereby drive the engine; and
    subsequent to igniting the fuel and oxidant, provide further fuel and/or oxidant into the combustion chamber, such that levels of fuel and oxidant in the combustion chamber approach stochiometric proportions.

5. The internal combustion engine of claim 4, wherein the further fuel and/or oxidant is provided in the same stroke of the engine as the initial fuel and oxidant and while the fuel and oxidant are still combusting.

6. The internal combustion engine of claim 1, wherein the fuel comprises hydrogen, and the oxidant comprises oxygen of at least 90% purity.

7. The internal combustion engine of claim 6, wherein excess oxygen is provided to act as a buffer for combustion of the fuel and oxidant.

8. The internal combustion engine of claim 1, wherein the engine comprises the at least one piston, wherein the at least one piston is driven by the combustion of the fuel and oxidant in the compressionless operating mode, wherein the fuel and oxidant is injected into the combustion chamber when the at least one piston is at or near top dead center, and wherein the at least one piston compresses the fluid in the combustion chamber in the compression generating operating mode.

9. The internal combustion engine of claim 1, wherein the engine comprises a discharge valve provided in association with a discharge port to enable the product of the combusted fuel and the oxidant to escape from the combustion chamber, the engine further comprising a condensing manifold, coupled to the discharge port, configured to provide a low pressure environment to the combustion chamber to thereby at least assist in driving the engine using a pressure differential.

10. The internal combustion engine of claim 9, wherein the condensing manifold comprises one or more heat exchangers, configured to remove heat from the combustion product in the condensing manifold, and a one-way valve, downstream from the discharge valve, to enable excess product to escape from the condensing manifold, while enabling a low-pressure environment to be created therein.

11. The internal combustion engine of claim 1, wherein the engine is configured to inject pre-heated water into the combustion chamber, the pre-heated water not chemically involved in the combustion of the fuel and the oxidant, to assist in providing torque to the engine.

12. The internal combustion engine of claim 1, wherein the engine configurable to switch between the compressionless operating mode where the engine is driven at least partly by combustion of fuel and oxidant in the combustion chamber and a non-combustion operating mode where the engine is driven at least partly without combustion in the combustion chamber, while the engine is running.

13. The internal combustion engine of claim 12, wherein the engine is configurable to operate in a steam powered operating mode where the engine is driven by the expansion of the water into steam in the combustion chamber.

14. The internal combustion engine of claim 1, wherein the compressionless operating mode comprises a twin-stroke cycle comprising an expansive power stroke, followed by a discharge stroke and wherein the discharge stroke comprises a contractive power stroke.

15. The internal combustion engine of claim 1, wherein the compression generating operating mode provides engine braking by restricting the flow of gas from a discharge port of the combustion chamber to compress fluid in the combustion chamber.

16. The internal combustion engine of claim 1, wherein in the compression generating operating mode the engine compresses air, the engine comprising an intake valve, for receiving uncompressed air, and a discharge valve, for providing the compressed air.

17. The internal combustion engine of claim 1, wherein the engine is configurable to operate in an air powered mode, wherein the engine is driven, at least in part, by the compressed air.

18. The internal combustion engine of claim 1, comprising a plurality of cylinders, wherein each cylinder is selectively configurable to operate in one or more operating modes, comprising a compressionless and a compression generating operating mode.

19. A method of operating an internal combustion engine comprising a combustion chamber, the method comprising:
configuring the engine to operate in a compressionless operating mode where the engine is driven by combustion of fuel and oxidant in the combustion chamber without compression of the fuel and oxidant by a compression stroke of the engine without using any piston to compress the fuel and the oxidant; and
subsequently reconfiguring the engine to operate in a compression generating operating mode where the engine is used to compress a fluid in the combustion chamber using at least one piston to compress the fluid, wherein the fluid includes at least one of air or steam, and discharging the fluid that has been compressed without any fuel in the combustion chamber.

20. A power system comprising:
electrolysis unit to generate hydrogen and oxygen from water;
storage means, for storing hydrogen and oxygen; and
an engine according to claim 1, configured to drive a generator to generate power.

* * * * *